United States Patent
Gao

(10) Patent No.: US 11,646,819 B2
(45) Date of Patent: May 9, 2023

(54) INFORMATION TRANSMISSION METHOD, TERMINAL AND BASE STATION

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 108 days.

(21) Appl. No.: 17/262,852

(22) PCT Filed: Jul. 23, 2019

(86) PCT No.: PCT/CN2019/097231
§ 371 (c)(1),
(2) Date: Jan. 25, 2021

(87) PCT Pub. No.: WO2020/020131
PCT Pub. Date: Jan. 30, 2020

(65) Prior Publication Data
US 2021/0242966 A1    Aug. 5, 2021

(30) Foreign Application Priority Data
Jul. 24, 2018 (CN) .......................... 201810820011.2

(51) Int. Cl.
*H04L 1/00* (2006.01)
*H04W 72/1263* (2023.01)
*H04W 72/12* (2023.01)

(52) U.S. Cl.
CPC .......... *H04L 1/0061* (2013.01); *H04L 1/0067* (2013.01); *H04W 72/1263* (2013.01); *H04W 72/1284* (2013.01)

(58) Field of Classification Search
CPC ... H04L 1/0056; H04L 1/0061; H04L 1/0067; H04L 2012/5631; H04L 43/16;
(Continued)

(56) References Cited

U.S. PATENT DOCUMENTS

| 2013/0238954 A1* | 9/2013 | Jang ...................... H04L 5/0053 714/758 |
| 2015/0016373 A1* | 1/2015 | Hwang ................. H04L 1/1812 370/329 |

(Continued)

FOREIGN PATENT DOCUMENTS

| CN | 107342844 A | 11/2017 |
| CN | 107646182 A | 1/2018 |
| EP | 3780435 A1 | 2/2021 |

OTHER PUBLICATIONS

Chinese Office Action dated May 21, 2020 for CN Application No. 201810820011.2.
(Continued)

*Primary Examiner* — Warner Wong
(74) *Attorney, Agent, or Firm* — Harness, Dickey & Pierce, P.L.C.

(57) ABSTRACT

An information transmission method, a base station and a base station are provided. The information transmission method includes: judging whether a bit count of uplink control information UCI meets a predetermined bit count range; in a case that the bit count of the UCI meets the predetermined bit count range, determining, according to a reference cyclic redundancy check CRC bit count, a resource for transmitting UCI; transmitting the UCI on the determined resource for transmitting UCI.

16 Claims, 3 Drawing Sheets

(58) Field of Classification Search
CPC ............ H04W 72/12; H04W 72/1263; H04W 72/1268; H04W 72/1278; H04W 72/1284; H04W 72/0406; H04W 74/002; H04W 78/00; H04W 72/00; H04W 72/04
See application file for complete search history.

(56) References Cited

U.S. PATENT DOCUMENTS

| | | | | |
|---|---|---|---|---|
| 2015/0245345 | A1* | 8/2015 | Gao | H04L 5/0055 |
| | | | | 370/329 |
| 2016/0353430 | A1 | 12/2016 | Chen et al. | |
| 2017/0366380 | A1* | 12/2017 | Hwang | H04L 5/001 |
| 2018/0131474 | A1* | 5/2018 | Berggren | H04L 1/0061 |
| 2018/0199331 | A1* | 7/2018 | Wang | H04L 1/0061 |
| 2018/0206224 | A1* | 7/2018 | Hwang | H04L 5/0012 |
| 2018/0220413 | A1* | 8/2018 | Yang | H04L 1/0041 |
| 2019/0215824 | A1* | 7/2019 | Takeda | H04L 5/0051 |
| 2019/0223184 | A1* | 7/2019 | Sarkis | H04W 72/0413 |
| 2019/0260503 | A1 | 8/2019 | Zhang et al. | |
| 2021/0029694 | A1* | 1/2021 | Nayeb Nazar | H04L 5/0048 |
| 2021/0058920 | A1* | 2/2021 | Lin | H04L 5/0055 |
| 2021/0152289 | A1* | 5/2021 | Lee | H04L 1/0073 |
| 2021/0160732 | A1* | 5/2021 | Lee | H04L 5/0046 |

OTHER PUBLICATIONS

Written Opinion and International Search Report for International Application No. PCT/CN2019/097231 dated Jan. 26, 2021.
Huawei, HiSilicon, "Outcome offline discussion on PUCCH structure in long-duration", 3GPP TSG RAN WG1 Meeting #93, R1-1807631, Busan, Korea, May 21-25, 2018.
CATT, "Remaining issues for long PUCCH", Agenda Item 7.1.3.2.2, 3GPP TSG RAN WG1 Meeting #93, R1-1806295, Busan, Korea, May 21-25, 2018.
European Patent Office Communication pursuant to Article 94(3) EPC, dated Mar. 17, 2022 for Application No. EP 19 842 267.7.
3GPP TS 38.213, V15.2.0 (Jun. 2018), 3rd Generation Partnership Project; Technical Specification Group Radio Access Network; NR; Physical layer procedures for control (Release 15).
Korean Office Action dated Jan. 7, 2022 for Application No. KR 10-2021-7003923.
3GPP TS 38.212, V15.2.0 (Jun. 2018), 3rd Generation Partnership Project; Technical Specification Group Radio Access Network; NR; Multiplexing and channel coding (Release 15).
Extended European Search Report dated Jul. 19, 2021 for Application No. EP 19 84 2267.
Sharp, "Discussions on RB selection for PUCCH resource", Agenda Item 7.1.3.2.2, 3GPP TSG RAN WG1#92b Meeting, R1-1804882, Apr. 16-20, 2018, Sanya, China.

* cited by examiner

INFORMATION TRANSMISSION METHOD, TERMINAL AND BASE STATION

CROSS-REFERENCE TO RELATED APPLICATIONS

The present application is a U.S. national phase application of PCT Application No. PCT/CN2019/097231 filed on Jul. 23, 2019, which claims a priority to the Chinese patent application No. 201810820011.2 filed in China on Jul. 24, 2018, a disclosure of which is incorporated herein by reference in its entirety.

TECHNICAL FIELD

The present disclosure relates to the technical field of communication applications, in particular, relates to an information transmission method, a terminal and a base station.

BACKGROUND

With development and evolvement of demands on mobile communication services, multiple organizations, such as International Telecommunication Union (ITU), are beginning to research $5^{th}$ generation new radio access technology (5 Generation New RAT (Radio Access Technology), 5G NR) for future mobile communication systems. In a 5G NR system, uplink control information (Uplink Control Information, UCI) is coded by using polar codes when a bit count of the UCI exceeds 11 bits. A polar encoder needs to append cyclic redundancy check (Cyclic Redundancy Check, CRC) bits to the UCI. For UCI of 12 bits to 19 bits, a quantity of polar-encoded CRC bits is 6; for UCI with a bit count greater than 19 bits, the quantity of polar-encoded CRC bits is 11. Particularly, in a case that the bit count of UCI is greater than or equal to 360 bits, in consideration of an encoding characteristic and a performance of polar encoder, it is necessary to further determine whether UCI segmentation is to be performed. Specifically, whether UCI is to be segmented is determined according to an encoded bit count of the UCI. For example, if the bit count of UCI is greater than or equal to 360 bits and the encoded bit count of UCI is greater than or equal to 1088 bits, or if the bit count of UCI is greater than or equal to 1013 bits, the UCI is segmented. In segmenting the UCI, original UCI bits are segmented into two group. Each group undergoes polar encoding separately, then each group has 11 bits of CRC appended thereto. Thus, a decision as to whether to segment the UCI influences a final CRC bit count, i.e., the CRC bit count is 11 bits if no segmentation is performed, and the CRC bit count is 11+11=22 bits if the segmentation is performed.

In NR, multiple physical uplink control channel (PUCCH) resources may be configured for transmitting multiple channel state information (CSI) reports. In case of a collision of multiple CSI reports, the CSI reports may be transmitted simultaneously on the PUCCH resources for transmitting multiple CSI reports, to avoid discarding too much CSI. According to a CSI bit count and corresponding CRC bit count, a PUCCH resource meeting a configured target code rate may be selected from the multiple PUCCH resources for transmitting multiple CSI reports.

In NR, if it is determined to transmit one or more types of UCI on a certain PUCCH resource, a minimum resource block (Resource Block, RB) count meeting a target code rate may further be determined according to a total UCI bit count and a total CRC bit count to transmit the UCI, in order to reduce PUCCH resource overhead, wherein the RB count may not exceed the quantity of RBs contained in the determined PUCCH resource.

The CRC bit count is required to determine the PUCCH resource for carrying the UCI. However, in the case that the UCI bit count is greater than or equal to 360 bits, there is no definite solution to UCI transmission since, absent the knowledge of the PUCCH resource, whether UCI is to be segmented cannot be determined, and then the actual CRC bit count cannot be determined.

SUMMARY

An objective of the present disclosure is to provide an information transmission method, a terminal and a base station, to solve the problem that when a bit count of UCI is greater than or equal to 360 bits and whether UCI is to be segmented cannot be determined, the actual CRC bit count cannot be determined, and then there is no definite solution to UCI transmission.

To accomplish the object, the present disclosure provides an information transmission method. The method is applied to a terminal and includes:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

transmitting the UCI on the determined resource for transmitting the UCI.

In a possible embodiment of the present disclosure, after the judging whether a bit count of uplink control information (UCI) meets a predetermined bit count range, the method further includes:

in a case that the bit count of the UCI does not meet the predetermined bit count range, determining the resource for transmitting the UCI according to an actual CRC bit count.

In a possible embodiment of the present disclosure, the predetermined bit count range is greater than or equal to a first bit count value and less than a second bit count value; or, the predetermined bit count range is greater than or equal to the first bit count value.

In a possible embodiment of the present disclosure, the first bit count value is 360, and/or the second bit count value is 1013.

In a possible embodiment of the present disclosure, the reference CRC bit count is determined by following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is a predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is the predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at the predetermined code rate is greater than or equal to the preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is the predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is the predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than the preset threshold value and the second encoded bit count is greater than or equal to the preset threshold value.

In a possible embodiment of the present disclosure, the first predetermined CRC bit count is 11 bits, and/or, the second predetermined CRC bit count is 22 bits, and/or, the preset threshold value is 1088.

In a possible embodiment of the present disclosure, the determining a resource for transmitting the UCI according to a reference cyclic redundancy check (CRC) bit count includes at least one of following means:

means 1: in a case that the UCI is transmitted on a physical uplink control channel (PUCCH), calculating an actual resource block (RB) count of RBs used by the PUCCH according to the reference CRC bit count;

means 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;

means 3: in a case that the UCI includes a CSI part 2, determining a resource for transmitting the CSI part 2 and a resource for transmitting UCI other than the CSI part 2 among determined PUCCH resources according to the reference CRC bit count.

In a possible embodiment of the present disclosure, the determining a resource for transmitting the UCI according to a reference cyclic redundancy check (CRC) bit count includes:

in a case that the UCI is transmitted on a physical uplink shared channel (PUSCH), calculating a size of a transmission resource, on the PUSCH, of the UCI according to the reference CRC bit count.

In a possible embodiment of the present disclosure, before the determining a resource for transmitting the UCI according to a reference cyclic redundancy check (CRC) bit count, the method further includes:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

In a possible embodiment of the present disclosure, the UCI includes at least one of a hybrid automatic repeat request-acknowledgement (HARQ-ACK), channel state information (CSI) and a scheduling request (SR).

To accomplish the objective, an embodiment of the present disclosure further provides an information transmission method. The method is applied to a base station and includes:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

receiving the UCI on the determined resource for transmitting the UCI.

In a possible embodiment of the present disclosure, after the judging whether a bit count of uplink control information (UCI) meets a predetermined bit count range, the method further includes:

in a case that the bit count of the UCI does not meet the predetermined bit count range, determining the resource for transmitting the UCI according to an actual CRC bit count.

In a possible embodiment of the present disclosure, the predetermined bit count range is greater than or equal to a first bit count value and less than a second bit count value; or, the predetermined bit count range is greater than or equal to the first bit count value.

In a possible embodiment of the present disclosure, the first bit count value is 360, and/or the second bit count value is 1013.

In a possible embodiment of the present disclosure, the reference CRC bit count is determined by following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is the predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is the predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at the predetermined code rate is greater than or equal to the preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is the predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is a predetermined CRC bit count value in a case that the first encoded bit count is less than the preset threshold value and the second encoded bit count is greater than or equal to the preset threshold value.

In a possible embodiment of the present disclosure, the first predetermined CRC bit count is 11 bits, and/or, the second predetermined CRC bit count is 22 bits, and/or, the preset threshold value is 1088.

In a possible embodiment of the present disclosure, the determining a resource for transmitting the UCI according to a reference cyclic redundancy check (CRC) bit count includes at least one of following means:

means 1: in a case that the UCI is transmitted on a physical uplink control channel (PUCCH), calculating an actual resource block (RB) count of RBs used by the PUCCH according to the reference CRC bit count;

means 2: in a case that the UCI is channel state information (CSI) and multiple PUCCH resources for transmitting multiple CSIs are configured, selecting one PUCCH resource for receiving the CSI from the multiple PUCCH resources for transmitting the multiple CSIs according to the reference CRC bit count;

means 3: in a case that the UCI includes a CSI part 2, determining a resource for receiving the CSI part 2 and a resource for receiving UCI other than the CSI part 2 among determined PUCCH resources according to the reference CRC bit count.

In a possible embodiment of the present disclosure, the determining a resource for transmitting the UCI according to a reference cyclic redundancy check (CRC) bit count includes:

in a case that the UCI is transmitted on a physical uplink shared channel (PUSCH), calculating a size of a transmission resource, on the PUSCH, of the UCI according to the reference CRC bit count.

In a possible embodiment of the present disclosure, before the determining a resource for transmitting the UCI according to a reference cyclic redundancy check (CRC) bit count, the method further includes:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

In a possible embodiment of the present disclosure, the UCI includes at least one of a hybrid automatic repeat request-acknowledgement (HARQ-ACK), channel state information (CSI) and a scheduling request (SR).

To accomplish the objective, an embodiment of the present disclosure further provides a terminal, including: a transceiver, a storage, a processor and a program stored on the storage and configured to be executed by the processor, wherein the processor is configured to execute the program to implement following steps:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

transmitting, by means of the transceiver, the UCI on the determined resource for transmitting the UCI.

In a possible embodiment of the present disclosure, the processor is configured to execute the program to further implement following step:

in a case that the bit count of the UCI does not meet the predetermined bit count range, determining the resource for transmitting the UCI according to an actual CRC bit count.

In a possible embodiment of the present disclosure, the predetermined bit count range is greater than or equal to a first bit count value and less than a second bit count value; or, the predetermined bit count range is greater than or equal to the first bit count value.

In a possible embodiment of the present disclosure, the first bit count value is 360, and/or the second bit count value is 1013.

In a possible embodiment of the present disclosure, the processor is configured to execute the program to further implement following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; determining that the reference CRC bit count is a predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at the predetermined code rate is greater than or equal to the preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is a predetermined CRC bit count value in a case that the first encoded bit count is less than the preset threshold value and the second encoded bit count is greater than or equal to the preset threshold value.

In a possible embodiment of the present disclosure, the first predetermined CRC bit count is 11 bits, and/or, the second predetermined CRC bit count is 22 bits, and/or, the preset threshold value is 1088.

In a possible embodiment of the present disclosure, the processor is configured to execute the program to further implement at least one of following means:

means 1: in a case that the UCI is transmitted on a physical uplink control channel (PUCCH), calculating an actual resource block (RB) count of RBs used by the PUCCH according to the reference CRC bit count;

means 2: in a case that the UCI is channel state information (CSI) and multiple PUCCH resources for transmitting multiple CSI are configured, selecting one PUCCH resource for transmitting the CSI from the multiple PUCCH resources for transmitting the multiple CSI according to the reference CRC bit count;

means 3: in a case that the UCI includes a CSI part 2, determining a resource for transmitting the CSI part 2 and a resource for transmitting UCI other than the CSI part 2 among determined PUCCH resources according to the reference CRC bit count.

In a possible embodiment of the present disclosure, the processor is configured to execute the program to further implement following step:

in a case that the UCI is transmitted on a physical uplink shared channel (PUSCH), calculating a size of a transmission resource, on the PUSCH, of the UCI according to the reference CRC bit count.

In a possible embodiment of the present disclosure, the processor is configured to execute the program to further implement following steps:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

In a possible embodiment of the present disclosure, the UCI includes at least one of a hybrid automatic repeat request-acknowledgement (HARQ-ACK), channel state information (CSI) and a scheduling request (SR).

To accomplish the objective, an embodiment of the present disclosure further provides a computer readable storage medium storing therein a computer program, wherein the computer program is configured to be executed by a processor to implement steps of the foregoing information transmission method.

To accomplish the objective, an embodiment of the present disclosure further provides a base station, including: a transceiver, a storage, a processor and a program stored on the storage and configured to be executed by the processor, wherein the processor is configured to execute the program to implement following steps:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

receiving, by means of the transceiver, the UCI on the determined resource for transmitting the UCI.

In a possible embodiment of the present disclosure, the processor is configured to execute the program to further implement following step:

in a case that the bit count of the UCI does not meet the predetermined bit count range, determining the resource for transmitting the UCI according to an actual CRC bit count.

In a possible embodiment of the present disclosure, the predetermined bit count range is greater than or equal to a first bit count value and less than a second bit count value; or, the predetermined bit count range is greater than or equal to the first bit count value.

In a possible embodiment of the present disclosure, the first bit count value is 360, and/or the second bit count value is 1013.

In a possible embodiment of the present disclosure, the processor is configured to execute the program to further implement following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is the predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at the predetermined code rate is greater than or equal to the preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than the preset threshold value and the second encoded bit count is greater than or equal to the preset threshold value.

In a possible embodiment of the present disclosure, the first predetermined CRC bit count is 11 bits, and/or, the second predetermined CRC bit count is 22 bits, and/or, the preset threshold value is 1088.

In a possible embodiment of the present disclosure, the processor is configured to execute the program to further implement at least one of following means:

means 1: in a case that the UCI is transmitted on a physical uplink control channel (PUCCH), calculating an actual resource block (RB) count of RBs used by the PUCCH according to the reference CRC bit count;

means 2: in a case that the UCI is channel state information (CSI) and multiple PUCCH resources for transmitting multiple CSIs are configured, selecting one PUCCH resource for receiving the CSI from the multiple PUCCH resources for transmitting the multiple CSIs according to the reference CRC bit count;

means 3: in a case that the UCI includes a CSI part 2, determining a resource for receiving the CSI part 2 and a resource for receiving UCI other than the CSI part 2 among determined PUCCH resources according to the reference CRC bit count.

In a possible embodiment of the present disclosure, the processor is configured to execute the program to further implement following step:

in a case that the UCI is transmitted on a physical uplink shared channel (PUSCH), calculating a size of a transmission resource, on the PUSCH, of the UCI according to the reference CRC bit count.

In a possible embodiment of the present disclosure, the processor is configured to execute the program to further implement following steps:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

In a possible embodiment of the present disclosure, the UCI includes at least one of a hybrid automatic repeat request-acknowledgement (HARQ-ACK), channel state information (CSI) and a scheduling request (SR).

To accomplish the objective, an embodiment of the present disclosure further provides a computer readable storage medium storing therein a computer program, wherein the computer program is configured to be executed by a processor to implement steps of the foregoing information transmission method.

To accomplish the objective, an embodiment of the present disclosure further provides a terminal, including:

a first judging module, configured to judge whether a bit count of uplink control information (UCI) meets a predetermined bit count range;

a first determination module, configured to, in a case that the bit count of the UCI meets the predetermined bit count range, determine a resource for transmitting the UCI according to a reference cyclic redundancy check (CRC) bit count;

a transmission module, configured to transmit the UCI on the determined resource for transmitting the UCI.

In a possible embodiment of the present disclosure, the first determination module is configured to:

determine that the reference CRC bit count is a predetermined CRC bit count value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value, determine that the reference CRC bit count is a predetermined CRC bit count value in a case that the first encoded bit count is less than the preset threshold value, wherein the second predetermined CRC bit count is greater than the first predetermined CRC bit count; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value, determine that the reference CRC bit count is a predetermined CRC bit count value in a case that the second encoded bit count is greater than or equal to the preset threshold value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value; judge whether a second encoded bit count corresponding to a sum of the bit count of the UCI and a second predetermined CRC bit count at the predetermined code rate is greater than or equal to the preset threshold value in a case that the first encoded bit count is less than the preset threshold value, determine that the reference CRC bit count is the first predetermined CRC bit count in a case that the second encoded bit count is less than the preset threshold value, determine that the reference CRC bit count is a predetermined CRC bit count value in a case that the second encoded bit count is greater than or equal to the preset threshold value; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value; determine whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determine that the reference CRC bit count is the second predetermined CRC bit count in a case that the first encoded bit count is greater than or equal to the preset threshold value, determine that the reference CRC bit count is a predetermined CRC bit count value in a case that the first encoded bit count is less than the preset threshold value; or, determine a first encoded bit count corresponding to a sum of the bit count of the UCI and a first predetermined CRC bit count at a predetermined code rate and determine a second encoded bit count corresponding to a sum of the bit count of the UCI and a second predetermined CRC bit count at the predetermined code rate, determine that the reference CRC bit count is the second predetermined CRC bit count in a case that the first encoded bit count is greater than or equal to a preset threshold value, determine that the reference CRC bit count is the first predetermined CRC bit count in a case that the second encoded bit count is less than the preset threshold value, determine that the reference CRC bit count is the predetermined CRC bit count value in a case that the first encoded bit count is less than the preset threshold value and the second encoded bit count is greater than or equal to the preset threshold value.

In a possible embodiment of the present disclosure, the first determination module is configured to implement at least one of following means:

means 1: in a case that the UCI is transmitted on a physical uplink control channel (PUCCH), calculating an actual resource block (RB) count of RBs used by the PUCCH according to the reference CRC bit count;

means 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;

means 3: in a case that the UCI includes a CSI part 2, determining a resource for transmitting the CSI part 2 and a resource for transmitting UCI other than the CSI part 2 among determined PUCCH resources according to the reference CRC bit count.

In a possible embodiment of the present disclosure, the first determination module is configured to, in a case that the UCI is transmitted on a physical uplink shared channel (PUSCH), calculate a size of a transmission resource, on the PUSCH, of the UCI according to the reference CRC bit count.

To accomplish the objective, an embodiment of the present disclosure further provides a base station, including:

a second judging module, configured to judge whether a bit count of uplink control information (UCI) meets a predetermined bit count range;

a second determination module, configured to, in a case that the bit count of the UCI meets the predetermined bit count range, determine a resource for transmitting the UCI according to a reference cyclic redundancy check (CRC) bit count;

a reception module, configured to receive the UCI on the determined resource for transmitting the UCI.

In a possible embodiment of the present disclosure, the second determination module is configured to:

determine that the reference CRC bit count is a predetermined CRC bit count value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value, determine that the reference CRC bit count is a predetermined CRC bit count value in a case that the first encoded bit count is less than the preset threshold value, wherein the second predetermined CRC bit count is greater than the first predetermined CRC bit count; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value, determine that the reference CRC bit count is a predetermined CRC bit count value in a case that the second encoded bit count is greater than or equal to the preset threshold value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value; judge whether a second encoded bit count corresponding to a sum of the bit count of the UCI and a second predetermined CRC bit count at the predetermined code rate is greater than or equal to the preset threshold value in a case that the first encoded bit count is less than the preset threshold value, determine that the reference CRC bit count is the first predetermined CRC bit count in a case that the second encoded bit count is less than the preset threshold value, determine that the reference CRC bit count is a predetermined CRC bit count value in a case that the second encoded bit count is greater than or equal to the preset threshold value; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value; determine whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determine that the reference CRC bit count is the second predetermined CRC bit count in a case that the first encoded bit count is greater than or equal to the preset threshold value, determine that the reference CRC bit count is a predetermined CRC bit count value in a case that the first encoded bit count is less than the preset threshold value; or, determine a first encoded bit count corresponding to a sum of the bit count of the UCI and a first predetermined CRC bit count at a predetermined code rate and determine a second encoded bit count corresponding to a sum of the bit count of the UCI and a second predetermined CRC bit count at the predetermined code rate, determine that the reference CRC bit count is the second predetermined CRC bit count in a case that the first encoded bit count is greater than or equal to a preset threshold value, determine that the reference CRC bit count is the first predetermined CRC bit count in a case that the second encoded bit count is less than the preset threshold value, determine that the reference CRC bit count is a predetermined CRC bit count value in a case that the first encoded bit count is less than the preset threshold value and the second encoded bit count is greater than or equal to the preset threshold value.

In a possible embodiment of the present disclosure, the second determination module is configured to implement at least one of following means:

means 1: in a case that the UCI is transmitted on a physical uplink control channel (PUCCH), calculating an actual resource block (RB) count of RBs used by the PUCCH according to the reference CRC bit count;

means 2: in a case that the UCI is channel state information (CSI) and multiple PUCCH resources for transmitting multiple CSIs are configured, selecting one PUCCH resource for receiving the CSI from the multiple PUCCH resources for transmitting the multiple CSIs according to the reference CRC bit count;

means 3: in a case that the UCI includes a CSI part 2, determining a resource for receiving the CSI part 2 and a resource for receiving UCI other than the CSI part 2 among determined PUCCH resources according to the reference CRC bit count.

In a possible embodiment of the present disclosure, the second determination module is configured to, in a case that the UCI is transmitted on a physical uplink shared channel (PUSCH), calculate a size of a transmission resource, on the PUSCH, of the UCI according to the reference CRC bit count.

The embodiments of the present disclosure have the following beneficial effects: in the foregoing technical solutions of the embodiments of the present disclosure, it is judged whether a bit count of uplink control information (UCI) meets a predetermined bit count range; in a case that the bit count of the UCI meets the predetermined bit count range, a resource for transmitting the UCI is determined according to a reference cyclic redundancy check (CRC) bit count; the UCI is transmitted on the determined resource for transmitting the UCI, thus the problem of being difficult to determine CRC bit count, when the PUCCH resource for transmitting the UCI is determined according to the CRC bit count, is solved, and consistent understanding of UCI transmission resource between the base station and the terminal can be ensured, so that the proper UCI transmission is ensured.

DETAILED DESCRIPTION

To describe the technical problem to be solved, the technical solutions and the advantages of the present disclosure more clearly, specific embodiments are described in detail hereinafter with reference to the accompanying drawings.

Figure 1:
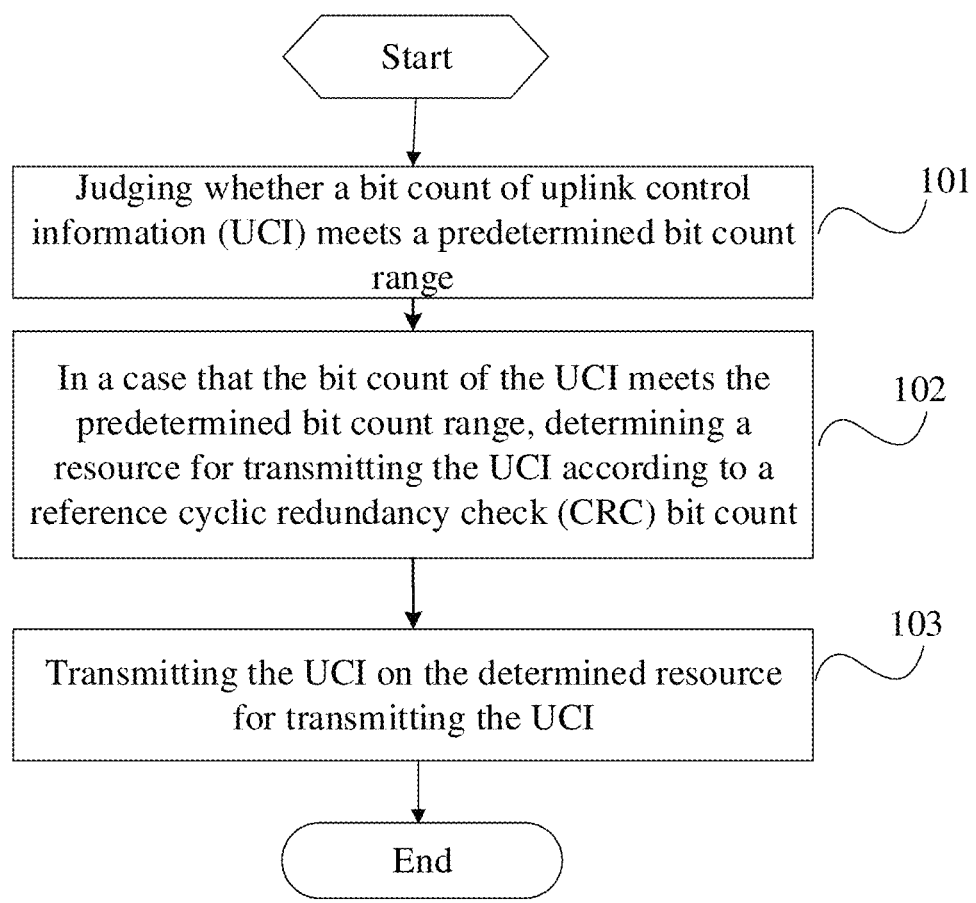
FIG. 1 is a first flow diagram of an information transmission method according to an embodiment of the present disclosure.

As shown in FIG. 1, an embodiment of the present disclosure provides an information transmission method. The method is applied to a terminal and includes step 101, step 102 and step 103.

Step 101: Judging whether a bit count of uplink control information (UCI) meets a predetermined bit count range.

The predetermined bit count range is greater than or equal to a first bit count value and less than a second bit count value; or, the predetermined bit count range is greater than or equal to the first bit count value.

The first bit count value is 360, and/or the second bit count value is 1013. In embodiments of the present disclosure, the UCI includes, but is not limited to, at least one of a hybrid automatic repeat request-acknowledgement (Hybrid Automatic Repeat Request-Acknowledgement, HARQ-ACK), channel state information (CSI) or a scheduling request (Scheduling Request, SR).

Step 102: In a case that the bit count of the UCI meets the predetermined bit count range, determining a resource for transmitting the UCI according to a reference cyclic redundancy check (CRC) bit count.

The reference CRC bit count is determined through the following steps:

determining that the reference CRC bit count is a predetermined CRC bit count value, e.g., 11 bits; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is the predetermined CRC bit count value in a case that the first encoded bit count is less than the preset threshold value, wherein the second predetermined CRC bit count is greater than the first predetermined CRC bit count; in the embodiment of the present disclosure, the preset threshold value may specifically be 1088, the first predetermined CRC bit count is specifically 11 bits, and the second predetermined CRC bit count is 22 bits; here, in the case that the first encoded bit count is greater than or equal to 1088, it is determined that the reference CRC bit count is 22 bits, i.e., it is may be confirmed that the UCI needs to be segmented, in other words, a size of a resource for transmitting the UCI is determined based on CRC of 22 bits; in the case that the first encoded bit count is less than 1088, it is determined that the reference CRC bit count is the predetermined CRC bit count value, in other words, the size of the resource for transmitting the UCI is determined based on the predetermined reference CRC bit count;

or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is the predetermined CRC bit count value in a case that the second encoded bit count is greater than or equal to the preset threshold value; here, in the case that the second encoded bit count is less than 1088, it is determined that the reference CRC bit count is 11 bits, i.e., it is may be confirmed that the UCI does not need to be segmented, in other words, the size of the resource for transmitting the UCI is determined based on CRC of 11 bits; in the case that the second encoded bit count is greater than or equal to 1088, it is determined that the reference CRC bit count is a predetermined value, in other words, the size of the resource for transmitting the UCI is determined based on the predetermined reference CRC bit count;

or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, judging whether a second encoded bit count corresponding to a sum of the bit count of the UCI and a second predetermined CRC bit count at the predetermined code rate is greater than or equal to the preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is the predetermined CRC bit count value in a case that the second encoded bit count is greater than or equal to the preset threshold value; here, the reference CRC bit count is determined according to the first encoded bit count and the second encoded bit count; specifically, in the case that the first encoded bit count is greater than or equal to 1088, it is determined that the reference CRC bit count is 22 bits, i.e., it is may be confirmed that the UCI needs to be segmented, in other words, the size of resource for transmitting the UCI is determined based on CRC of 22 bits; in the case that the first encoded bit count is less than 1088, it is further judged whether the second encoded bit count is greater than or equal to 1088, in the case that the second encoded bit count is less than 1088, it is determined that the reference CRC bit count is 11 bits, i.e., it is may be confirmed that the UCI does not need to be segmented, in other words, the size of resource for transmitting the UCI is determined based on CRC of 11 bits; in the case that the second encoded bit count is greater than or equal to 1088, it is determined that the reference CRC bit count is the predetermined value, in other words, the size of the resource for transmitting the UCI is determined based on the predetermined reference CRC bit count;

or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is the predetermined CRC bit count value in a case that the first encoded bit count is less than the preset threshold value; here, the reference CRC bit count is determined according to the first encoded bit count and the second encoded bit count; specifically, it is further judged whether the second encoded bit count is greater than or equal to 1088, in the case that the second encoded bit count is less than 1088, it is determined that the reference CRC bit count is 11 bits, i.e., it is may be confirmed that the UCI does not need to be segmented, in other words, the size of the resource for transmitting the UCI is determined based on CRC of 11 bits; in the case that the second encoded bit count is greater than or equal to 1088, it is further judged whether the first encoded bit count is greater than or equal to 1088, in the case that the first encoded bit count is greater than or equal to 1088, it is determined that the reference CRC bit count is 22 bits, i.e., it is may be confirmed that the UCI needs to be segmented, in other words, the size of the resource for transmitting the UCI is determined based on CRC of 22 bits; in the case that the first encoded bit count is less than 1088, it is determined that the reference CRC bit count is the predetermined CRC bit count value, in other words, the size of resource for transmitting the UCI is determined based on the predetermined reference CRC bit count;

or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than the preset threshold value and the second encoded bit count is greater than or equal to the preset threshold value.

In the case that the first encoded bit count is greater than or equal to 1088 (the second encoded bit count is surely greater than 1088 in this case), it is determined that the reference CRC bit count is 22 bits, i.e., it is may be confirmed that the UCI needs to be segmented, in other words, the size of resource for transmitting the UCI is determined based on CRC of 22 bits; in the case that the second encoded bit count is less than 1088 (the first encoded bit count is surely less than 1088 in this case), it is determined that the reference CRC bit count is 11 bits, i.e., it is may be confirmed that the UCI does not need to be segmented, in other words, the size of resource for transmitting the UCI is determined based on CRC of 11 bits.

In the case that the first encoded bit count is less than 1088 and the second encoded bit count is greater than or equal to 1088, it is determined that the reference CRC bit count is the predetermined CRC bit count value, in other words, the size of resource for transmitting the UCI is determined based on the predetermined based on the predetermined reference CRC bit count.

It is noted, in the embodiment of the present disclosure, the first predetermined CRC bit count is 11 bits, and/or, the second predetermined CRC bit count is 22 bits, and/or, the preset threshold value is 1088.

Step 103: Transmitting the UCI on the determined resource for transmitting the UCI.

In the information transmission method according to the embodiments of the present disclosure, it is judged whether a bit count of uplink control information (UCI) meets a predetermined bit count range; in a case that the bit count of the UCI meets the predetermined bit count range, a resource for transmitting the UCI is determined according to a reference cyclic redundancy check (CRC) bit count; the UCI is transmitted on the determined resource for transmitting the UCI, thus the problem of being difficult to determine CRC bit count, when the PUCCH resource for transmitting the UCI is determined according to the CRC bit count, is solved, and consistent understanding of UCI transmission resource between the base station and the terminal can be ensured, so that proper UCI transmission is ensured.

Further, as an optional implementation, the determining a resource for transmitting the UCI according to a reference cyclic redundancy check (CRC) bit count in the step 102 includes at least one of following means:

means 1: in a case that the UCI is transmitted on a physical uplink control channel (PUCCH), calculating an actual resource block (RB) count of RBs used by the PUCCH according to the reference CRC bit count;

means 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;

means 3: in a case that the UCI includes a CSI part 2, determining a resource for transmitting the CSI part 2 and a resource for transmitting UCI other than the CSI part 2 among determined PUCCH resources according to the reference CRC bit count.

The UCI other than the CSI part 2 may be one or more of HARQ-ACK, SR or CSI part 1.

Further, as a second optional implementation, the determining a resource for transmitting the UCI according to a reference cyclic redundancy check (CRC) bit count in the step 102 includes: in a case that the UCI is transmitted on a physical uplink shared channel (PUSCH), calculating a size of a transmission resource, on the PUSCH, of the UCI according to the reference CRC bit count.

Further, after the judging whether a bit count of uplink control information (UCI) meets a predetermined bit count range, the method further includes: in a case that the bit count of the UCI does not meet the predetermined bit count range, determining the resource for transmitting the UCI according to an actual CRC bit count.

Further, before the determining a resource for transmitting the UCI according to a reference cyclic redundancy check (CRC) bit count, the method further includes: judging whether a maximum encoded bit count of UCI carried on an uplink channel for carrying UCI is greater than or equal to a preset threshold value; in a case that the maximum encoded bit count is greater than or equal to the preset threshold value, performing the step of determining the resource for transmitting the UCI according to the reference CRC bit count.

The preset threshold value is 1088. In the embodiment of the present disclosure, it is first judged whether a maximum encoded bit count of UCI carried on an uplink channel for carrying UCI is greater than or equal to 1088, if the maximum encoded bit count is greater than or equal to 1088, the step 102 is performed; otherwise, it is directly judged that the UCI does not need to be segmented, then the size of resource for transmitting the UCI is determined based on the CRC bit count corresponding to the UCI bit count range directly without having to use the reference CRC bit count.

In the information transmission method according to the embodiments of the present disclosure, it is judged whether a bit count of uplink control information (UCI) meets a predetermined bit count range; in a case that the bit count of the UCI meets the predetermined bit count range, a resource for transmitting the UCI is determined according to a reference cyclic redundancy check (CRC) bit count; the UCI is transmitted on the determined resource for transmitting the UCI, thus the problem of being difficult to determine CRC bit count, when the PUCCH resource for transmitting the UCI is determined according to the CRC bit count, is solved, and consistent understanding of a UCI transmission resource between the base station and the terminal can be ensured, so that proper UCI transmission is ensured.

Figure 2:
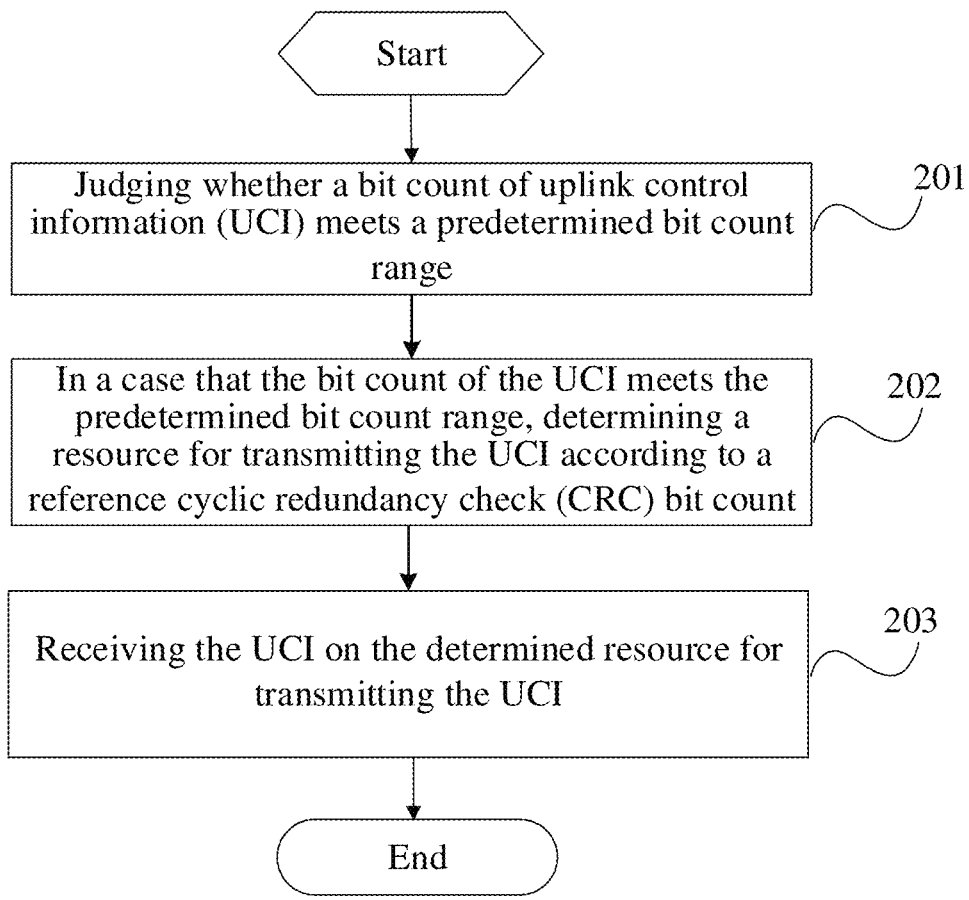
FIG. 2 is a second flow diagram of an information transmission method according to an embodiment of the present disclosure.

As shown in FIG. 2, an embodiment of the present disclosure further provides an information transmission method. The method is applied to a base station and includes step 201, step 202 and step 203.

Step 201: Judging whether a bit count of uplink control information (UCI) meets a predetermined bit count range.

The predetermined bit count range is greater than or equal to a first bit count value and less than a second bit count value; or, the predetermined bit count range is greater than or equal to the first bit count value.

The first bit count value is specifically 360, and/or the second bit count value is 1013. In embodiments of the present disclosure, the UCI includes, but is not limited to, at least one of a hybrid automatic repeat request-acknowledgement (HARQ-ACK), channel state information (CSI) and a scheduling request (SR).

Step 202: In a case that the bit count of the UCI meets the predetermined bit count range, determining a resource for transmitting the UCI according to a reference cyclic redundancy check (CRC) bit count.

The reference CRC bit count is determined through the following steps:

determining that the reference CRC bit count is a predetermined CRC bit count value, e.g., 11 bits;

or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is a predetermined CRC bit count value in a case that the first encoded bit count is less than the preset threshold value, wherein the second predetermined CRC bit count is greater than the first predetermined CRC bit count; in the embodiment of the present disclosure, the preset threshold value may specifically be 1088, the first predetermined CRC bit count is specifically 11 bits, and the second predetermined CRC bit count is 22 bits; here, in the case that the first encoded bit count is greater than or equal to 1088, it is determined that the reference CRC bit count is 22 bits, i.e., it is may be confirmed that the UCI needs to be segmented, in other words, the size of resource for transmitting the UCI is determined based on CRC of 22 bits; in the case that the first encoded bit count is less than 1088, it is determined that the reference CRC bit count is the predetermined CRC bit count value, in other words, the size of resource for transmitting the UCI is determined based on the predetermined reference CRC bit count;

or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is the predetermined CRC bit count value in a case that the second encoded bit count is greater than or equal to the preset threshold value; here, in the case that the second encoded bit count is less than 1088, it is determined that the reference CRC bit count is 11 bits, i.e., it is may be confirmed that the UCI does not need to be segmented, in other words, the size of resource for transmitting the UCI is determined based on CRC of 11 bits; in the case that the second encoded bit count is greater than or equal to 1088, it is determined that the reference CRC bit count is the predetermined value, in other words, the size of resource for transmitting the UCI is determined based on the predetermined reference CRC bit count;

or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, judging whether a second encoded bit count corresponding to a sum of the bit count of the UCI and a second predetermined CRC bit count at the predetermined code rate is greater than or equal to the preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is the predetermined CRC bit count value in a case that the second encoded bit count is greater than or equal to the preset threshold value; here, the reference CRC bit count is determined according to the first encoded bit count and the second encoded bit count; specifically, in the case that the first encoded bit count is greater than or equal to 1088, it is determined that the reference CRC bit count is 22 bits, i.e., it is may be confirmed that the UCI needs to be segmented, in other words, the size of resource for transmitting the UCI is determined based on CRC of 22 bits; in the case that the first encoded bit count is less than 1088, it is further judged whether the second encoded bit count is greater than or equal to 1088, in the case that the second encoded bit count is less than 1088, it is determined that the reference CRC bit count is 11 bits, i.e., it is may be confirmed that the UCI does not need to be segmented, in other words, the size of resource for transmitting the UCI is determined based on CRC of 11 bits; in the case that the second encoded bit count is greater than or equal to 1088, it is determined that the reference CRC bit count is the predetermined value, in other words, the size of resource for transmitting the UCI is determined based on the predetermined reference CRC bit count;

or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is the predetermined CRC bit count value in a case that the first encoded bit count is less than the preset threshold value; here, the reference CRC bit count is determined according to the first encoded bit count and the second encoded bit count; specifically, it is further judged whether the second encoded bit count is greater than or equal to 1088, it is determined that the reference CRC bit count is 11 bits in the case that the second encoded bit count is less than 1088, i.e., it is may be confirmed that the UCI does not need to be segmented, in other words, the size of resource for transmitting the UCI is determined based on CRC of 11 bits; in the case that the second encoded bit count is greater than or equal to 1088, it is further judged whether the first encoded bit count is greater than or equal to 1088, it is determined that the reference CRC bit count is 22 bits in the case that the first encoded bit count is greater than or equal to 1088, i.e., it is may be confirmed that the UCI needs to be segmented, in other words, the size of resource for transmitting the UCI is determined based on CRC of 22 bits; in the case that the first encoded bit count is less than 1088, it is determined that the reference CRC bit count is the predetermined CRC bit count value, in other words, the size of resource for transmitting the UCI is determined based on the predetermined reference CRC bit count;

or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than the preset threshold value and the second encoded bit count is greater than or equal to the preset threshold value.

In the case that the first encoded bit count is greater than or equal to 1088 (the second encoded bit count is surely greater than 1088 in this case), it is determined that the reference CRC bit count is 22 bits, i.e., it is may be confirmed that the UCI needs to be segmented, in other words, the size of resource for transmitting the UCI is determined based on CRC of 22 bits; in the case that the second encoded bit count is less than 1088 (the first encoded bit count is surely less than 1088 in this case), it is determined that the reference CRC bit count is 11 bits, i.e., it is may be confirmed that the UCI does not need to be segmented, in other words, the size of resource for transmitting the UCI is determined based on CRC of 11 bits.

In the case that the first encoded bit count is less than 1088 and the second encoded bit count is greater than or equal to 1088, it is determined that the reference CRC bit count is the predetermined CRC bit count value, in other words, the size of resource for transmitting the UCI is determined based on the predetermined reference CRC bit count.

It is noted, in the embodiment of the present disclosure, the first predetermined CRC bit count is 11 bits, and/or, the second predetermined CRC bit count is 22 bits, and/or, the preset threshold value is 1088.

Step 203: Receiving the UCI on the determined resource for transmitting the UCI.

In the information transmission method according to the embodiments of the present disclosure, it is judged whether a bit count of uplink control information (UCI) meets a predetermined bit count range; in a case that the bit count of the UCI meets the predetermined bit count range, a resource for transmitting the UCI is determined according to a reference cyclic redundancy check (CRC) bit count; the UCI is received on the determined resource for transmitting the UCI, thus the problem of being difficult to determine CRC bit count, when the PUCCH resource for transmitting the UCI is determined according to the CRC bit count, is solved, and consistent understanding of a UCI transmission resource between the base station and the terminal can be ensured, so that the proper UCI transmission is ensured.

Further, as an optional implementation, the determining a resource for transmitting the UCI according to a reference cyclic redundancy check (CRC) bit count in the step 202 includes at least one of following means:

means 1: in a case that the UCI is transmitted on a physical uplink control channel (PUCCH), calculating an actual count of resource blocks (RB) used by the PUCCH according to a reference CRC bit count;

means 2: in a case that the UCI is channel state information (CSI) and multiple PUCCH resources for transmitting multiple CSI are configured, selecting one PUCCH resource for transmitting the CSI from the multiple PUCCH resources for transmitting the multiple CSI according to the reference CRC bit count;

means 3: in a case that the UCI includes a CSI part 2, determining a resource for transmitting the CSI part 2 and a resource for transmitting UCI other than the CSI part 2 among determined PUCCH resources according to the reference CRC bit count.

The resource for UCI other than the CSI part 2 may be one or more of HARQ-ACK, SR and CSI part 1.

Further, as a second optional implementation, the determining a resource for transmitting the UCI according to a reference cyclic redundancy check (CRC) bit count in the step 202 includes: in a case that the UCI is transmitted on a physical uplink shared channel (PUSCH), calculating a size of a transmission resource, on the PUSCH, of the UCI according to the reference CRC bit count.

Further, after the judging whether a bit count of uplink control information (UCI) meets a predetermined bit count range, the information transmission method further includes: in a case that the bit count of the UCI does not meet the predetermined bit count range, determining the resource for transmitting the UCI according to an actual CRC bit count.

Further, before the determining a resource for transmitting the UCI according to a reference cyclic redundancy check (CRC) bit count, the information transmission method further includes: judging whether a maximum encoded bit count of UCI carried on an uplink channel carrying the UCI is greater than or equal to a preset threshold value; in a case that the maximum encoded bit count is greater than or equal to the preset threshold value, performing the step of determining the resource for transmitting the UCI according to the reference CRC bit count.

In the embodiment of the present disclosure, the preset threshold value is 1088. It is first judged whether a maximum encoded bit count of UCI carried on an uplink channel carrying UCI is greater than or equal to 1088, if the maximum encoded bit count is greater than or equal to 1088, the step 202 is performed; otherwise, it is directly judged that the UCI does not need to be segmented, then the size of resource for transmitting the UCI is determined based on the CRC bit count corresponding to the UCI bit count range directly without having to use the reference CRC bit count.

In the information transmission method according to the embodiments of the present disclosure, it is judged whether a bit count of uplink control information (UCI) meets a predetermined bit count range; in a case that the bit count of the UCI meets the predetermined bit count range, a resource for transmitting the UCI is determined according to a reference cyclic redundancy check (CRC) bit count; the UCI is transmitted on the determined resource for transmitting the UCI, thus the problem of being difficult to determine CRC bit count, when the PUCCH resource for transmitting the UCI is determined according to the CRC bit count, is solved, and consistent understanding of a UCI transmission resource between the base station and the terminal can be ensured, so that the proper UCI transmission is ensured.

The information transmission method according to the present disclosure is described with respect to specific examples hereinafter.

Example 1

It is assumed that UCI needs to be transmitted on a PUCCH at a time instant n, and the PUCCH resource at least has parameters such as a code rate r, an RB count $M_{RB}^{PUCCH}$ and a PUCCH symbol length; it is assumed that the PUCCH is of a format 3, the PUCCH has a symbol length of 14 symbols, wherein a quantity of symbols carrying UCI transmission $N_{symb\text{-}UCI}^{PUCCH}=12$, the PUCCH uses QPSK modulation, i.e., a corresponding modulation order $Q_m=2$, a quantity of REs carrying UCI in each RB $N_{sc\text{-}ctrl}^{RB}=12$, and the bit count of the UCI meets a predetermined bit count range, e.g., the bit count is a value greater than or equal to 360 and less than 1013, or the bit count is a value greater than or equal to 360.

Case 1 (using a reference CRC directly): assuming $M_{RB}^{PUCCH}=6$, r=0.5, assuming the UCI bit count OUCI is 400 bits, since it cannot be determined whether the encoded bit count of the UCI exceeds 1088 bits prior to determination of a PUCCH resource size, it cannot be judged whether the UCI needs to be segmented, and in turn it cannot be judged whether the 400-bit UCI corresponds to CRC of 11 bits or CRC of 22 bits, so a reference CRC bit count is used to determine the PUCCH resource size for transmitting the UCI, that is, assuming that the reference CRC bit count OCRC is predefined as 11 bits, the actual RB count $M_{RB,min}^{PUCCH}=3$ of the PUCCH is further determined based on a to-be-transmitted bit count OUCI+OCRC=411 and the PUCCH code rate according to the following formula (1), wherein the $M_{RB,min}^{PUCCH}$ is a value not greater than $M_{RB}^{PUCCH}$. In this case, the $M_{RB,min}^{PUCCH}$ RBs are $M_{RB,min}^{PUCCH}$ RBs starting from an initial RB of $M_{RB}^{PUCCH}$ RBs corresponding to the PUCCH resource. In other words, it is determined that merely 3 RBs starting from the initial RB of the 6 RBs are actually used for the PUCCH to transmit the 400-bit UCI. During determination of the RB count of PUCCH for transmitting the UCI, the assumed reference CRC bit count does not affect the actual CRC bits determined during the actual encoding of the UCI. In other words, the actual CRC bits are always determined based on the UCI bit count range and whether UCI segmentation is performed. For example, when the UCI bit count ranges from 12 bits to 19 bits, the CRC bit count is 6 bits; when the UCI bit count is greater than 19 bits, specifically, if the UCI bit count is greater than or equal to 360 and the encoded bit count of UCI is greater than or equal to 1088, or if the UCI bit count is greater than or equal to 1013 bits, then UCI segmentation is performed, and the CRC bit count is 22 bits, otherwise, UCI segmentation is not performed, and the CRC bit count is 11 bits. In this case, the encoded bit count of UCI carried by the 3 RBs is $M_{RB}^{PUCCH} \cdot N_{sc\text{-}ctrl}^{RB} \cdot N_{symb\text{-}UCI}^{PUCCH} \cdot Q_m=864$ bits, which is no more than 1088, thus it is determined that UCI segmentation is not required, and the actual CRC bit count for the UCI is 11 bits, which is consistent with the reference CRC. In this way, it is ensured that the code rate of the 400-bit UCI transmitted on the PUCCH occupying 3 RBs does not exceed the target code rate r;

$$(O_{UCI}+O_{CRC}) \le M_{RB,min}^{PUCCH} \cdot N_{sc,ctrl}^{RB} \cdot N_{symb\text{-}UCI}^{PUCCH} \cdot Q_m \cdot r;$$

and $(O_{UCI}+O_{CRC}) \ge (M_{RB,min}^{PUCCH}-1) \cdot N_{sc,ctrl}^{RB} \cdot N_{symb\text{-}UCI}^{PUCCH} \cdot Q_m \cdot r;$   formula (1):

wherein if $(O_{UCI}+O_{CRC}) \ge (M_{RB}^{PUCCH}) \cdot N_{sc,ctrl}^{RB} \cdot N_{symb\text{-}UCI}^{PUCCH} \cdot Q_m \cdot r$, the transmission takes place on the $M_{RB}^{PUCCH}$ RBs, in other words, the resource is in insufficient, and all RBs included in the PUCCH need to be occupied, to reach the code rate r as close as possible.

Case 2 (using reference CRC directly): assuming that $M_{RB}^{PUCCH}=6$, r=0.3, assuming that the UCI bit count is 430 bits; similar to the case 1, a reference CRC bit count is used to determine a size of the PUCCH resource for transmitting the UCI, to obtain an actual RB count $M_{RB,min}^{PUCCH}=5$ of the PUCCH, wherein the $M_{RB,min}^{PUCCH}$ is a value not greater than $M_{RB}^{PUCCH}$. In this case, the $M_{RB,min}^{PUCCH}$ are $M_{RB,min}^{PUCCH}$ RBs starting from the initial RB of the $M_{RB}^{PUCCH}$ RBs corresponding to the PUCCH resource. In other words, it is determined that merely 5 RBs starting from the initial RB of the 6 RBs are actually used for the PUCCH to transmit the 430-bit UCI. During the determination of the actual CRC bit count, since the encoded bit count of UCI carried by the 5 RBs is $M_{RB}^{PUCCH} \cdot N_{sc-ctrl}^{RB} \cdot N_{symb-UCI}^{PUCCH} \cdot Q_m = 1440$ bits, which exceeds 1088, the UCI segmentation is required, and then the actual CRC bit count for the UCI is 22 bits, which is greater than the reference CRC bit count. In this case, the code rate of the 430-bit UCI transmitted on the PUCCH occupying 5 RBs may be slightly greater than the target code rate r, e.g. $r = (430+22)/M_{RB}^{PUCCH} \cdot N_{sc,ctrl}^{RB} \cdot N_{symb-UCI}^{PUCCH} \cdot Q_m = 0.31$; but for this condition, the benefit of the reference CRC bit count consists in that the resource determination can always be performed according to an assumed CRC bit count, so that a simple unification can be realized by preventing the base station and the terminal from using different CRC bit counts to determine resource. When it is assumed that the reference CRC bit count is 11 bits, a situation in which the actual code rate for the UCI transmission is slightly greater than the target code rate might occur if the actual CRC bit count is 22 bits. However, considering that a frequency domain resource is allocated in units of RBs, the situation in which the actual code rate for the UCI transmission is slightly greater than the target code rate occurs infrequently, and even if the situation does occur, the actual code rate does not deviate too far from the target code rate. For example, assuming that the UCI bit count is 400 bits and other parameters remain unchanged, the determined $M_{RB,min}^{PUCCH}$ is still 5, but in this case the code rate for the 400-bit UCI transmitted on the 5 RBs does not exceed the target code rate even if it is calculated based on the CRC bit count of 22 bits, e.g., $(400+22)/M_{RB}^{PUCCH} \cdot N_{sc,ctrl}^{RB} \cdot N_{symb-UCI}^{PUCCH} \cdot Q_m = 0.29$. In this case, were the reference CRC bit count set to 22 bits, it means that the actual CRC bit count will only be less than or equal to the reference CRC bit count, it can always be guaranteed to judge whether the UCI segmentation is performed on the basis of the determination as to whether the quantity of encoded bits carried on the actual determined resource exceeds 1088, and the code rate of transmission of the UCI will never exceed the target code rate, however, certain PUCCH resource waste will be incurred since PUCCH is always transmitted at a code rate less than the target code rate, which means that the transmission of PUCCH always occupies resources more than what is actual needed.

Case 3 (determining reference CRC bits according to the encoded bits corresponding to the UCI+11 bits): assuming that $M_{RB}^{PUCCH}=6$, $r=0.3$, assuming that the UCI bit count is 400 bits, since it cannot be determined whether the encoded bit count of the UCI exceeds 1088 prior to the determination of a size of a PUCCH resource, it cannot be judged whether the UCI needs to be segmented, and in turn it cannot be judged whether the 400-bit UCI corresponds to CRC of 11 bits or CRC of 22 bits. Then, firstly, a minimum encoded bit count corresponding to the UCI on the condition that the target code rate is not exceeded may be calculated according to CRC of 11 bits, e.g., the first encoded bit rate $A=(400+11)/0.3=1370$. Assuming that the PUCCH resource is large enough, it means that 1370 UCI encoded bits are still required on the condition that the target code rate is not exceeded even if the CRC of 11 bits is used for the calculation, and the encoded bit count of UCI is always greater than 1088. In this case, according to a minimum encoded bit count corresponding to the 22 bits on the condition that the target code rate is not exceeded, e.g., the second encoded bit rate $B=\text{ceil}((400+22)/0.3)=1407$, wherein ceil ( ) is rounding up to an integer, it can be further judged whether B exceeds 1088 as well. Of course, B may not be calculated, since if A is greater than 1088, then B is certainly greater than 1088. Thus, it may be determined that UCI segmentation is required, and the actual 22 CRC bits may be directly determined as the reference CRC bits. In this case, the quantity $M_{RB,min}^{PUCCH}$ of RBs on the PUCCH that are actually used for transmitting the UCI is determined according to the actual 22 CRC bits, then it can be calculated according to formula (1) that $M_{RB,min}^{PUCCH}=5$, that is, the 400-bit UCI can be actually transmitted by merely occupying 5 RBs out of 6 RBs corresponding to the PUCCH resource on the condition that the code rate r is not exceeded. In this case, the actual CRC bit count is consistent with the reference CRC bit count, and then the code rate of the transmission will never exceed the code rate r.

Case 4 (determining reference CRC bits according to the encoded bits corresponding to the UCI+22 bits): assuming that $M_{RB}^{PUCCH}=6$, $r=0.5$, assuming that the UCI bit count is 400 bits, since it cannot be determined whether the encoded bit count of the UCI exceeds 1088 bits prior to the determination of the size of the PUCCH resource, it cannot be judged whether the UCI needs to be segmented, and in turn it cannot be judged whether the 400-bit UCI corresponds to CRC of 11 bits or CRC of 22 bits. Then, firstly, a minimum encoded bit count corresponding to the UCI on the condition that the target code rate is not exceeded may be calculated according to CRC of 22 bits, e.g., $B=(400+22)/0.5=844$. Assuming that the PUCCH resource is large enough, it means that the corresponding encoded bit count of UCI will never exceed 1088 on the condition that the target code rate is not exceeded even if CRC of 22 bits is used for the calculation, and the encoded bit count of UCI is always not greater than 1088. In this case, according to a minimum encoded bit count corresponding to the 11 bits on the condition that the target code rate is not exceeded, e.g., $A=(400+11)/0.5=822$, it can be further judged whether A exceeds 1088. Of course, a value of the A may not be calculated, since if B is no greater than 1088, then A is certainly less than 1088. Thus, it may be determined that UCI segmentation is not required, and the actual 11 CRC bits may be directly determined as the reference CRC bits. In this case, the quantity of RBs on the PUCCH that are actually used for transmitting the UCI $M_{RB,min}^{PUCCH}$ is determined according to the actual CRC of 11 bits, then it can be calculated according to formula (1) that $M_{RB,min}^{PUCCH}=3$, that is, the 400-bit UCI can be actually transmitted by merely occupying 3 RBs out of 6 RBs corresponding to the PUCCH resource on the condition that the code rate r is not exceeded. In this case, the actual CRC bit count is consistent with the reference CRC bit count, and then the transmission code rate will never exceed the code rate r.

Case 5 (determining reference CRC bits according to the encoded bits corresponding to the UCI+11 bits and the encoded bits corresponding to the UCI+22 bits): assuming that $M_{RB}^{PUCCH}=6$, $r=0.5$, assuming that the UCI bit count is 530 bits, since it cannot be determined whether the encoded bit count of the UCI exceeds 1088 bits prior to the determination of the size of the PUCCH resource, it cannot be judged whether the UCI needs to be segmented, and in turn it cannot be judged whether the 530-bit UCI corresponds to CRC of 11 bits or CRC of 22 bits. Then, firstly, a minimum encoded bit count corresponding to the UCI on the condition that the target code rate is not exceeded may be calculated according to CRC of 11 bits, e.g., $A=(530+11)/0.5=1082$. Assuming that the PUCCH resource is large enough, it means that the corresponding encoded bit count of UCI does not exceed 1088 on the condition that the target code rate is not exceeded when the calculation is based on CRC of 11 bits. Base on this, it cannot be determined whether UCI bit segmentation is performed. Next, a minimum encoded bit count corresponding to the UCI on the condition that the target code rate is not exceeded may further be calculated according to CRC of 22 bits, e.g., B=(530+22)/0.5=1104. Assuming that the PUCCH resource is large enough, it means that the corresponding encoded bit count of UCI exceeds 1088 on the condition that the target code rate is not exceeded when the calculation is based on CRC of 22 bits, which means that in this case, it still cannot be determined whether UCI segmentation is performed. Thus, it is determined that the PUCCH resource is calculated according to the predetermined reference CRC bit count. For example, assuming that the predetermined reference CRC bit count is 11 bits, the quantity $M_{RB,min}^{PUCCH}$ of RBs on the PUCCH that are actually used for transmitting the UCI is determined according to the 11 CRC bits, then it can be calculated according to formula (1) that $M_{RB,min}^{PUCCH}=4$, that is, the 530-bit UCI can be actually transmitted by merely occupying 4 RBs out of 6 RBs corresponding to the PUCCH resource on the condition that the code rate r is not exceeded. In this case, the encoded bit count of UCI may be determined according to the quantity of RBs actually transmitted on the PUCCH, and then the actual CRC bits may be determined; a specific process thereof is similar to those in the case 1 and the case 2, thus a detail description is omitted.

In the aforementioned process, the following may also be applicable: firstly, B is determined according to CRC of 22 bits, then it is determined that B is greater than 1088, and it cannot be determined whether UCI segmentation is performed; next, A is determined according to CRC of 11 bits, then it is determined that A is less than 1088, and it cannot be determined whether UCI segmentation is performed, thus it is derived that the PUCCH resource is determined according to the predetermined reference CRC bit count. In other words, both the case in which A is determined first and the case in which B is determined first are permissible. Or, in the aforementioned process, the following may also be applicable: value A and value B are determined simultaneously and then it is judged according to the ranges corresponding to the value A and value B that the PUCCH resource is determined according to the predetermined reference CRC bit count.

Case 6 (first judging whether the reference CRC needs to be used according to a maximum quantity of bits carried by the PUCCH): assuming that $M_{RB}^{PUCCH}=3$, then according to parameters such as the quantity of RBs included in the PUCCH, it is determined that the encoded bit count of UCI that may be carried on the $M_{RB}^{PUCCH}$ RBs for the PUCCH is $M_{RB}^{PUCCH} \cdot N_{sc\text{-}ctrl}^{RB} \cdot N_{symb\text{-}UCI}^{PUCCH} \cdot Q_m = 864$ bits, which is no more than 1088, then no matter what the original UCI bit count is, the condition for UCI segmentation will not be met since the maximum quantity of encoded bits carried by the PUCCH for carrying the UCI transmission is no more than 1088. Thus, the CRC bit count is the actual CRC bit count corresponding to the UCI bit count in the case that UCI segmentation is not performed, for example, when the UCI bit count ranges from 12 bits to 19 bits, the CRC bit count is 6 bits, and when the UCI bit count is greater than 19 bits, the CRC bit count is 11 bits. The terminal further determines the quantity $M_{RB,min}^{PUCCH}$ of RBs on the PUCCH that are actually used for transmitting the UCI according to the actual CRC bit count corresponding to the UCI bit count based on the sum of UCI bit count and CRC bit count and the configured code rate r. For example, assuming that the UCI bit count is 370 bits, CRC=11 bits, and r=0.7, then it can be calculated according to formula (1) that $M_{RB,min}^{PUCCH}=2$, that is, the 370-bit UCI can be actually transmitted by merely occupying 2 RBs out of 3 RBs corresponding to the PUCCH resource on the condition that the code rate r is not exceeded. In this case, the actual CRC bit count is consistent with the reference CRC bit count, and then the transmission code rate will never exceed the code rate r.

Case 7 (first judging whether the reference CRC needs to be used according to a maximum quantity of bits carried by the PUCCH): assuming that $M_{RB}^{PUCCH}=6$, according to parameters such as the quantity of RBs included in the PUCCH, it is determined that the maximum quantity of encoded bits of UCI that may be carried on the $M_{RB}^{PUCCH}$ RBs for the PUCCH is $M_{RB}^{PUCCH} \cdot N_{sc\text{-}ctrl}^{RB} \cdot N_{symb\text{-}UCI}^{PUCCH} \cdot Q_m = 1728$ bits, which is greater than 1088, then in determining the actually transmitted RB count $M_{RB,min}^{PUCCH}$, either the situation that the encoded bit count of UCI carried on the $M_{RB,min}^{PUCCH}$ RBs is greater than or equal to 1088 or the situation that the encoded bit count of UCI carried on the $M_{RB,min}^{PUCCH}$ RBs is not more that 1088 may occur, which is totally dependent on the value of $M_{RB,min}^{PUCCH}$. Thus, it is necessary to perform the process of calculating the PUCCH resource according to the reference CRC bit count in the manners of foregoing case 1 to case 5. A specific process thereof is similar to the foregoing, thus a detail description is omitted.

Example 2

It is assumed that HARQ-ACK needs to be transmitted on a PUCCH at a time instant n, and the bit count of the HARQ-ACK meets a predetermined bit count range, e.g., the bit count is a value greater than or equal to 360 and less than 1013, or the bit count is a value greater than or equal to 360.

First, the quantity of mapped resource elements (RE, Resource Element) or the quantity of modulated symbols $Q'_{ACK}$ on the PUSCH corresponding to the HARQ-ACK is calculated according to the following formulas (2) and (3), wherein $O_{ACK}$ is the bit count of the HARQ-ACK, $L_{ACK}$ is the reference CRC bit count, $\beta_{offset}^{PUSCH}=\beta_{offset}^{HARQ\text{-}ACK}$ is a configured parameter for determining resource for the HARQ-ACK, $C_{UL\text{-}SCH}$ is a quantity of code blocks (CB) for carrying data (UL-SCH) on the PUSCH, $K_r$ is the size of the $r^{th}$ CB, $M_{sc}^{PUSCH}$ is a modulated bandwidth of the PUSCH and is in a unit of a size of a subcarrier (SC), $M_{sc}^{UCI}(l)$ is the quantity of REs for transmitting the UCI that are included in an OFDM symbol l, $N_{symb,all}^{PUSCH}$ is the quantity of symbols included in the PUSCH, $\alpha$ is a scaling factor preconfigured by a higher-layer signaling, $l_0$ is a numbering value of the first symbol on the PUSCH that does not contain a DMRS, $N_L$ represents the quantity of layers; next, the encoded bit count $E_{UCI}$ of UCI corresponding to the HARQ-ACK on the PUSCH is calculated according to the following formula (3), then it is determined whether UCI segmentation is required according to the encoded bit count of UCI, so as to determine whether the actual CRC bit count for the UCI is 11 bits or 22 bits. A specific process thereof is similar to those in the case 1 to case 7 of the example 1.

For case 1 or 2, $Q'_{ACK}$ is calculated by directly using the predetermined reference CRC bit count, e.g., 11 bits, as $L_{ACK}$, and thereby the encoded bit count $E_{UCI}$ of UCI is obtained. The actual CRC bit count determined according to the encoded bit count of UCI may be like that in the case 1, that is, the actual CRC bit count is consistent with the reference CRC bit count; or the actual CRC bit count determined according to the encoded bit count of UCI may be like that in the case 2, that is, the actual CRC bit count is greater than the reference CRC bit count. In this case, when the transmission is performed according to the actual CRC bit count on the resource determined based on the reference CRC bit count, the code rate is slightly higher.

For case 3 or 4, according to pre-judgement for results of the calculations based on 11 bits or 22 bits, $L_{ACK}$ is directly determined to be the actual CRC bit count, so that it is ensured that the HARQ-ACK transmission resource determined based on the reference CRC bit count according to the following formulas (2) and (3) matches with actual needs.

For case 5, according to the pre-judgement of the results of the calculations based on 11 bits or 22 bits, it cannot be determined whether the UCI is segmented. Thus, the process has to revert to those in case 1 or case 2, to determine a resource according to the predetermined reference CRC bit count. The subsequent specific process is similar to those in the case 1 or case 2, thus a detailed description thereof is omitted.

For case 6 or 7, different from the case 6 or 7 in the example 1, it is necessary to replace the process of calculating the encoded bit count of UCI based on the quantity of RBs included in the PUCCH with the upper limit of transmission resource for HARQ-ACK on the PUSCH, i.e., $$\left[ \alpha \cdot \sum_{l=l_0}^{N_{symb,all}^{PUSCH}-1} M_{sc}^{UCI}(l) \right]$$

in the formula (2). In other words, firstly, $Q'_{ACK}$ is calculated according to $$\left[ \alpha \cdot \sum_{l=l_0}^{N_{symb,all}^{PUSCH}-1} M_{sc}^{UCI}(l) \right];$$

next, the upper limit $E_{UCI}$ of the encoded bit count of HARQ-ACK transmitted on the PUSCH is calculated according to the formula (3) $E_{UCI}=N_L \cdot Q'_{ACK} \cdot Q_m$; then it is judged whether the encoded bit count exceeds 1088. If the encoded bit count does not exceed 1088, i.e., as in the case 6 in the example 1, it may be directly judged that the UCI segmentation is not required, and it is determined that the actual CRC bit count of 11 bits is used as the reference CRC bit count to calculate $Q'_{ACK}$ and $E_{UCI}$ according to the following formula; if the encoded bit count exceeds 1088, then it cannot be judged whether UCI segmentation is required, and the process has to revert to the cases 1 to 5 for further processing, a detailed description of the specific process is omitted.

$$Q'_{ACK} = \min\left\{ \left[ \frac{(O_{ACK}+L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right], \right.$$ Formula (2)

$$\left. \left[ \alpha \cdot \sum_{l=l_0}^{N_{symb,all}^{PUSCH}-1} M_{sc}^{UCI}(l) \right] \right\}.$$

$E_{UCI}=N_L \cdot Q'_{ACK} \cdot Q_m.$ Formula (3):

The information transmission method according to the embodiments of the present disclosure is used to solve the problem that the CRC bit count is unknown when the PUCCH resource for transmitting the UCI is determined according to the CRC bit count, so as to ensure consistent understanding for UCI transmission resource between the base station and the terminal, and to ensure the proper UCI transmission.

Figure 3:
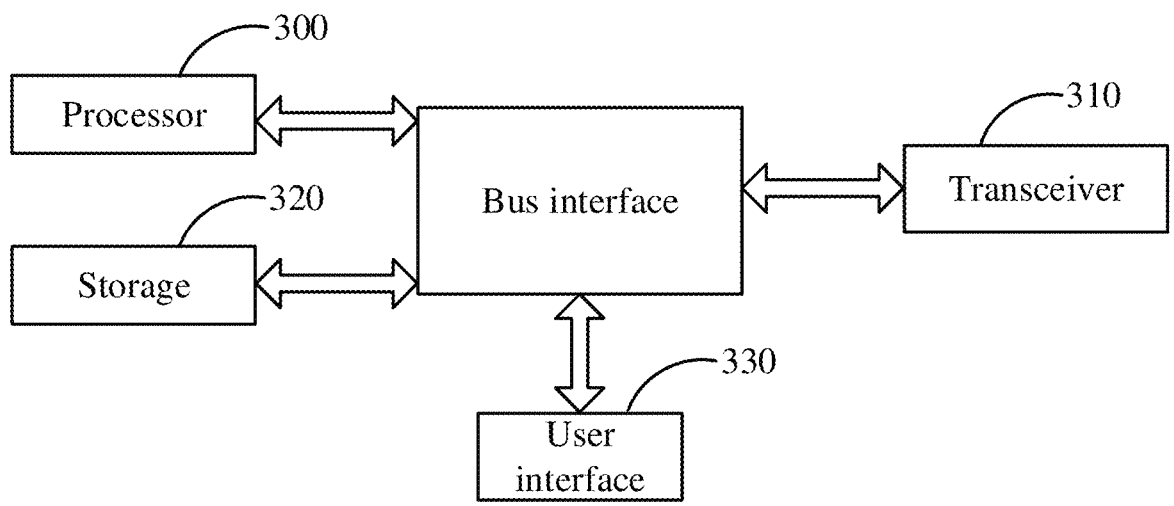
FIG. 3 is a structural block diagram of a terminal according to an embodiment of the present disclosure.

As shown in FIG. 3, an embodiment of the present disclosure further provides a terminal, including a transceiver 310, a storage 320, a processor 300 and a computer program stored in the storage 320 and configured to be executed by the processor, wherein the processor 300 is configured to execute the computer program to implement following steps:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

transmitting, through the transceiver, the UCI on the determined resource for transmitting the UCI.

In FIG. 3, a bus architecture may include any number of interconnected buses and bridges, and connects various circuits including one or more processors represented by the processor 300 and a storage represented by the storage 320. The bus architecture may also connect various other circuits such as peripherals, voltage regulators and power management circuits, which are well known in the art. Therefore, a detailed description thereof is omitted herein. A bus interface provides an interface. The transceiver 310 may be multiple elements, i.e., including a transmitter and a receiver, to provide a unit for communication with various other apparatuses on a transmission medium. For different UEs, the user interface 330 may be an interface capable of connecting externally or internally to a required device. The connected device includes, but is not limited to: a keypad, a display, a speaker, a microphone, a joystick or the like.

The processor 300 is responsible for supervising the bus architecture and normal operation and the storage 320 may store data being used by the processor 300 during operation.

Optionally, the processor 300 is further configured to read the computer program in the storage 320 to implement the following step:

in a case that the bit count of the UCI does not meet the predetermined bit count range, determining the resource for transmitting the UCI according to an actual CRC bit count.

Optionally, the predetermined bit count range is greater than or equal to a first bit count value and less than a second bit count value; or, the predetermined bit count range is greater than or equal to the first bit count value.

Optionally, the first bit count value is 360, and/or the second bit count value is 1013.

Optionally, the processor 300 is further configured to read the computer program in the storage 320 to implement the following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is a predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at a predetermined code rate is greater than or equal to a preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is the predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, following are performed: determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is a predetermined CRC bit count value in a case that the first encoded bit count is less than the preset threshold value and the second encoded bit count is greater than or equal to the preset threshold value.

Optionally, the first predetermined CRC bit count is 11 bits, and/or, the second predetermined CRC bit count is 22 bits, and/or, the preset threshold value is 1088.

Optionally, the processor 300 is further configured to read the computer program in the storage 320 to implement at least one of following means:

means 1: in a case that the UCI is transmitted on a physical uplink control channel (PUCCH), calculating an actual resource block (RB) count of RBs used by the PUCCH according to a reference CRC bit count;

means 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;

means 3: in a case that the UCI includes a CSI part 2, determining a resource for transmitting the CSI part 2 and a resource for transmitting UCI other than the CSI part 2 among determined PUCCH resources according to the reference CRC bit count.

Optionally, the processor 300 is further configured to read the computer program in the storage 320 to implement the following step:

in a case that the UCI is transmitted on a physical uplink shared channel (PUSCH), calculating a size of a transmission resource on the PUSCH for the UCI according to a reference CRC bit count.

Optionally, the processor 300 is further configured to read the computer program in the storage 320 to implement the following steps:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

Optionally, the UCI includes at least one of a hybrid automatic repeat request-acknowledgement (HARQ-ACK), channel state information (CSI) and a scheduling request (SR).

In some embodiments of the present disclosure, a computer readable storage medium storing therein a computer program is provided. The computer program is configured to be executed by a processor to implement the following steps:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

transmitting the UCI on the determined resource for transmitting the UCI.

The computer program is configured to be executed by a processor to realize all implementations of the embodiment of the information transmission method applied to the terminal side. To avoid repetition, a detail description is omitted herein.

Figure 4:
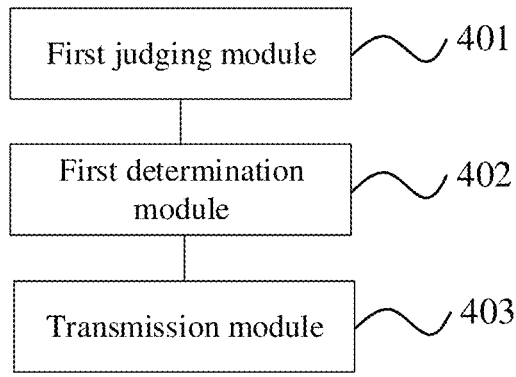
FIG. 4 is a schematic modular diagram of a terminal according to an embodiment of the present disclosure.

As shown in FIG. 4, an embodiment of the present disclosure further provides a terminal. The terminal includes:

a first judging module 401, configured to judge whether a bit count of uplink control information (UCI) meets a predetermined bit count range;

a first determination module 402, configured to, in a case that the bit count of the UCI meets the predetermined bit count range, determine a resource for transmitting the UCI according to a reference cyclic redundancy check (CRC) bit count;

a transmission module 403, configured to transmit the UCI on the determined resource for transmitting the UCI.

The terminal according to the embodiment of the present disclosure further includes: a third determination module configured to, in a case that the bit count of the UCI does not meet the predetermined bit count range, determine the resource for transmitting the UCI according to an actual CRC bit count.

In the terminal according to the embodiment of the present disclosure, the predetermined bit count range is greater than or equal to a first bit count value and less than a second bit count value; or, the predetermined bit count range is greater than or equal to the first bit count value.

In the terminal according to the embodiment of the present disclosure, the first bit count value is 360, and/or the second bit count value is 1013.

In the terminal according to the embodiment of the present disclosure, the first determination module is configured to:

determine that the reference CRC bit count is a predetermined CRC bit count value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value, determine that the reference CRC bit count is a predetermined CRC bit count value in a case that the first encoded bit count is less than the preset threshold value, wherein the second predetermined CRC bit count is greater than the first predetermined CRC bit count; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value, determine that the reference CRC bit count is a predetermined CRC bit count value in a case that the second encoded bit count is greater than or equal to the preset threshold value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value; judge whether a second encoded bit count corresponding to a sum of the bit count of the UCI and a second predetermined CRC bit count at the predetermined code rate is greater than or equal to a preset threshold value in a case that the first encoded bit count is less than the preset threshold value, determine that the reference CRC bit count is the first predetermined CRC bit count in a case that the second encoded bit count is less than the preset threshold value, determine that the reference CRC bit count is the predetermined CRC bit count value in a case that the second encoded bit count is greater than or equal to the preset threshold value; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value, determine whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determine that the reference CRC bit count is the second predetermined CRC bit count in a case that the first encoded bit count is greater than or equal to the preset threshold value, determine that the reference CRC bit count is the predetermined CRC bit count value in a case that the first encoded bit count is less than the preset threshold value; or, determine a first encoded bit count corresponding to a sum of the bit count of the UCI and a first predetermined CRC bit count at a predetermined code rate and determine a second encoded bit count corresponding to a sum of the bit count of the UCI and a second predetermined CRC bit count at the predetermined code rate, following determination is made: determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than a preset threshold value and the second encoded bit count is greater than or equal to the preset threshold value.

In the terminal according to the embodiment of the present disclosure, the first predetermined CRC bit count is 11 bits, and/or, the second predetermined CRC bit count is 22 bits, and/or, the preset threshold value is 1088.

In the terminal according to the embodiment of the present disclosure, the first determination module is configured to implement at least one of following means:

means 1: in a case that the UCI is transmitted on a physical uplink control channel (PUCCH), calculating an actual resource block (RB) count of RBs used by the PUCCH according to a reference CRC bit count;

means 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;

means 3: in a case that the UCI includes a CSI part 2, determining a resource for transmitting the CSI part 2 and a resource for transmitting UCI other than the CSI part 2 among determined PUCCH resources according to the reference CRC bit count.

In the terminal according to the embodiment of the present disclosure, the first determination module is configured to, in a case that the UCI is transmitted on a physical uplink shared channel (PUSCH), calculate a size of a transmission resource on the PUSCH of the UCI according to a reference CRC bit count.

The terminal according to the embodiment of the present disclosure further includes:

a third judging module, configured to judge whether a maximum encoded bit count of UCI carried on an uplink channel for carrying UCI is greater than or equal to a preset threshold value;

a first control module, configured to, in a case that the maximum encoded bit count is greater than or equal to the preset threshold value, control the first determination module to perform the step of determining the resource for transmitting the UCI according to the reference CRC bit count.

In the terminal according to the embodiment of the present disclosure, the UCI includes at least one of a hybrid automatic repeat request-acknowledgement (HARQ-ACK), channel state information (CSI) and a scheduling request (SR).

In the terminal according to the embodiment of the present disclosure, it is judged whether a bit count of uplink control information (UCI) meets a predetermined bit count range; in a case that the bit count of the UCI meets the predetermined bit count range, a resource for transmitting the UCI is determined according to a reference cyclic redundancy check (CRC) bit count; the UCI is transmitted on the determined resource for transmitting the UCI, thus the problem of being difficult to determine CRC bit count, when the PUCCH resource for transmitting the UCI is determined according to the CRC bit count, is solved, and consistent understanding of UCI transmission resource between the base station and the terminal can be ensured, so that the proper UCI transmission is ensured.

Figure 5:
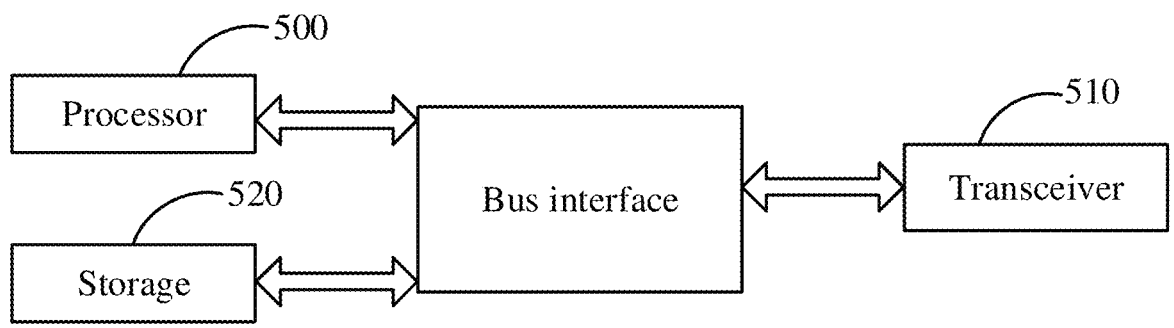
FIG. 5 is a structural block diagram of a base station according to an embodiment of the present disclosure.

As shown in FIG. 5, an embodiment of the present disclosure further provides a base station, including a storage 520, a processor 500, a transceiver 510, a bus interface and a computer program stored in the storage 520 and configured to be executable by the processor 500, wherein the processor 500 is configured to read the computer program in the storage 520 to implement following steps:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

receiving, through the transceiver, the UCI on the determined resource for transmitting the UCI.

In FIG. 5, a bus architecture may include any number of interconnected buses and bridges, and connects various circuits including one or more processors represented by the processor 500 and a storage represented by the storage 520. The bus architecture may also connect various other circuits such as peripherals, voltage regulators and power management circuits, which are well known in the art. Therefore, a detailed description thereof is omitted herein. A bus interface provides an interface. The transceiver 510 may be multiple elements, i.e., including a transmitter and a receiver, to provide a unit for communication with various other apparatuses on a transmission medium. The processor 500 is responsible for supervising the bus architecture and normal operation and the storage 520 may store the data being used by the processor 500 during operation.

Optionally, the processor 500 is configured to execute the computer program to further implement the following step:

in a case that the bit count of the UCI does not meet the predetermined bit count range, determining the resource for transmitting the UCI according to an actual CRC bit count.

Optionally, the predetermined bit count range is greater than or equal to a first bit count value and less than a second bit count value; or, the predetermined bit count range is greater than or equal to the first bit count value.

Optionally, the first bit count value is 360, and/or the second bit count value is 1013.

Optionally, the processor 500 is configured to execute the computer program to further implement the following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; determining that the reference CRC bit count is a predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at the predetermined code rate is greater than or equal to a preset threshold value in a case that the first encoded bit count is less than the preset threshold value, determining that the reference CRC bit count is the first predetermined CRC bit count in a case that the second encoded bit count is less than the preset threshold value; determining that the reference CRC bit count is a predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at a predetermined code rate is greater than or equal to the preset threshold value in a case that the second encoded bit count is greater than or equal to the preset threshold value, determining that the reference CRC bit count is a second predetermined CRC bit count in a case that the first encoded bit count is greater than or equal to a preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, following determination being performed: determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than the preset threshold value and the second encoded bit count is greater than or equal to the preset threshold value.

Optionally, the first predetermined CRC bit count is 11 bits, and/or, the second predetermined CRC bit count is 22 bits, and/or, the preset threshold value is 1088.

Optionally, the processor 500 is configured to execute the computer program to further implement at least one of following means:

means 1: in a case that the UCI is transmitted on a physical uplink control channel (PUCCH), calculating an actual resource block (RB) count of RBs used by the PUCCH according to a reference CRC bit count;

means 2: in a case that the UCI is channel state information (CSI) and multiple PUCCH resources for transmitting multiple CSIs are configured, selecting one PUCCH resource for receiving the CSI from the multiple PUCCH resources for transmitting the multiple CSIs according to the reference CRC bit count;

means 3: in a case that the UCI includes a CSI part 2, determining a resource for receiving the CSI part 2 and a resource for receiving UCI other than the CSI part 2 among determined PUCCH resources according to the reference CRC bit count.

Optionally, the processor 500 is configured to execute the computer program to further implement the following step:

in a case that the UCI is transmitted on a physical uplink shared channel (PUSCH), calculating a size of a transmission resource on the PUSCH for UCI according to a reference CRC bit count.

Optionally, the processor 500 is configured to execute the computer program to further implement the following steps:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

Optionally, the UCI includes at least one of a hybrid automatic repeat request-acknowledgement (HARQ-ACK), channel state information (CSI) and a scheduling request (SR).

In some embodiments of the present disclosure, a computer readable storage medium storing therein a computer program is further provided. The computer program is configured to be executed by a processor to implement the following steps:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

receiving the UCI on the determined resource for transmitting the UCI.

The computer program is configured to be executed by a processor to realize all implementations of the embodiment of the information transmission method applied to the base station side. To avoid repetition, a detail description is omitted herein.

Figure 6:
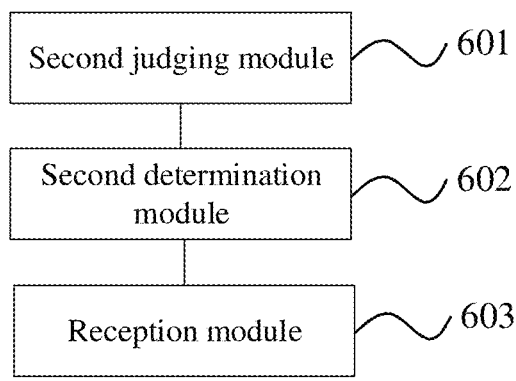
FIG. 6 is a schematic modular diagram of a base station according to an embodiment of the present disclosure

As shown in FIG. 6, an embodiment of the present disclosure further provides a base station. The base station includes:

a second judging module 601, configured to judge whether a bit count of uplink control information (UCI) meets a predetermined bit count range;

a second determination module 602, configured to, in a case that the bit count of the UCI meets the predetermined bit count range, determine a resource for transmitting the UCI according to a reference cyclic redundancy check (CRC) bit count;

a reception module 603, configured to receive the UCI on the determined resource for transmitting the UCI.

The base station according to the embodiment of the present disclosure further includes: a fourth determination module, configured to, in a case that the bit count of the UCI does not meet the predetermined bit count range, determine the resource for transmitting the UCI according to an actual CRC bit count.

In the base station according to the embodiment of the present disclosure, the predetermined bit count range is greater than or equal to a first bit count value and less than a second bit count value; or, the predetermined bit count range is greater than or equal to the first bit count value.

In the base station according to the embodiment of the present disclosure, the first bit count value is 360, and/or the second bit count value is 1013.

In the base station according to the embodiment of the present disclosure, the second determination module is configured to:

determine that the reference CRC bit count is a predetermined CRC bit count value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value; determine that the reference CRC bit count is a predetermined CRC bit count value in a case that the first encoded bit count is less than the preset threshold value, wherein the second predetermined CRC bit count is greater than the first predetermined CRC bit count; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value, determine that the reference CRC bit count is a predetermined CRC bit count value in a case that the second encoded bit count is greater than or equal to the preset threshold value; or, judge whether a first encoded bit count corresponding to a sum of the bit count of the UCI and a first predetermined CRC bit count at a predetermined code rate is greater than or equal to a preset threshold value, determine that the reference CRC bit count is a second predetermined CRC bit count in a case that the first encoded bit count is greater than or equal to the preset threshold value; judge whether a second encoded bit count corresponding to a sum of the bit count of the UCI and a second predetermined CRC bit count at the predetermined code rate is greater than or equal to the preset threshold value in a case that the first encoded bit count is less than the preset threshold value, determine that the reference CRC bit count is the first predetermined CRC bit count in a case that the second encoded bit count is less than the preset threshold value, determine that the reference CRC bit count is a predetermined CRC bit count value in a case that the second encoded bit count is greater than or equal to the preset threshold value; or, judge whether a second encoded bit count corresponding to a sum of the bit count of the UCI and a second predetermined CRC bit count at a predetermined code rate is greater than or equal to a preset threshold value, determine that the reference CRC bit count is a first predetermined CRC bit count in a case that the second encoded bit count is less than the preset threshold value; determine whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determine that the reference CRC bit count is a second predetermined CRC bit count in a case that the first encoded bit count is greater than or equal to the preset threshold value, determine that the reference CRC bit count is a predetermined CRC bit count value in a case that the first encoded bit count is less than the preset threshold value; or, determine a first encoded bit count corresponding to a sum of the bit count of the UCI and a first predetermined CRC bit count at a predetermined code rate and determine a second encoded bit count corresponding to a sum of the bit count of the UCI and a second predetermined CRC bit count at the predetermined code rate, and following determination is performed: determining that the reference CRC bit count is the second predetermined CRC bit count in a case that the first encoded bit count is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the first encoded bit count is less than the preset threshold value and the second encoded bit count is greater than or equal to the preset threshold value.

In the base station according to the embodiment of the present disclosure, the first predetermined CRC bit count is 11 bits, and/or, the second predetermined CRC bit count is 22 bits, and/or, the preset threshold value is 1088.

In the base station according to the embodiment of the present disclosure, the second determination module is configured to implement at least one of following means:

means 1: in a case that the UCI is transmitted on a physical uplink control channel (PUCCH), calculating an actual resource block (RB) count of RBs used by the PUCCH according to a reference CRC bit count;

means 2: in a case that the UCI is channel state information (CSI) and multiple PUCCH resources for transmitting multiple CSIs are configured, selecting one PUCCH resource for receiving the CSI from the multiple PUCCH resources for transmitting the multiple CSIs according to the reference CRC bit count;

means 3: in a case that the UCI includes a CSI part 2, determining a resource for receiving the CSI part 2 and a resource for receiving UCI other than the CSI part 2 among determined PUCCH resources according to the reference CRC bit count.

In the base station according to the embodiment of the present disclosure, the second determination module is configured to, in a case that the UCI is transmitted on a physical uplink shared channel (PUSCH), calculate a size of a transmission resource on the PUSCH for the UCI according to a reference CRC bit count.

The base station according to the embodiment of the present disclosure further includes:

a fourth judging module, configured to judge whether a maximum encoded bit count of UCI carried on an uplink channel for carrying UCI is greater than or equal to a preset threshold value;

a second control module, configured to, in a case that the maximum encoded bit count is greater than or equal to the preset threshold value, control the second determination module to perform the step of determining the resource for transmitting the UCI according to the reference CRC bit count.

In the base station according to the embodiment of the present disclosure, the UCI includes at least one of a hybrid automatic repeat request-acknowledgement (HARQ-ACK), channel state information (CSI) and a scheduling request (SR).

In the base station according to the embodiment of the present disclosure, it is judged whether a bit count of uplink control information (UCI) meets a predetermined bit count range; in a case that the bit count of the UCI meets the predetermined bit count range, a resource for transmitting the UCI is determined according to a reference cyclic redundancy check (CRC) bit count; the UCI is received on the determined resource for transmitting the UCI, thus the problem of being difficult to determine CRC bit count, when the PUCCH resource for transmitting the UCI is determined according to the CRC bit count, is solved, and consistent understanding of UCI transmission resource between the base station and the base station can be ensured, so that the proper UCI transmission is ensured.

In various embodiments of the present disclosure, it is understood, numbering values of various processes are not intended to imply an execution sequence of the processes. The execution sequence of the processes should be determined in accordance with the functions and inherent logic thereof, and by no means constitutes any limitation as to the implementation of the embodiments of the present disclosure.

An embodiment of the present disclosure further provides a computer readable storage medium storing therein a computer program. The computer program is configured to be executed by a processor to implement various processes of the method embodiments of the present disclosure, and may achieve the same technical effects. To avoid repetition, a detail description is omitted herein. The computer readable storage medium may be transitory or non-transitory, such as a read-only memory (Read-Only Memory, ROM), a random access memory (Random Access Memory, RAM), a magnetic disk or an optic disc.

It is noted that terms "include," "have," or any variations thereof in the present disclosure are intended to cover a non-exclusive inclusion, such that a process, a method, an article, or a device that includes a list of elements not only includes the list of elements, but also may include other elements not expressly listed or include elements inherent in the process, the method, the article, or the device. Without further restriction, an element preceded by "includes or including" does not preclude existence of additional identical elements in the process, the method, the article, or the device including the element.

From the foregoing description of the embodiments, a person skilled in the art will appreciate clearly that the method according to the embodiments may be implemented not only by software in conjunction with a necessary generic hardware platform, but also by hardware, although the former will be preferred in most cases. Based on such an understanding, essential parts, or parts contributing to the related art, of the technical solutions of the present disclosure may be implemented in a form of a software product. The software product is stored in a storage medium (e.g., a ROM/RAM, a magnetic disk and an optical disc) and includes several instructions configured to be executed by a terminal (such as a handset, a computer, a server, an air conditioner or a network device) to perform the method according to the embodiments of the present disclosure.

The foregoing describes optional implementations of the present disclosure. It should be noted that for a person of ordinary skill in the art, several improvements and modifications may further be made without departing from the principle of the present disclosure. These improvements and modifications should also be deemed as falling within the protection scope of the present disclosure.

What is claimed is:

1. An information transmission method, performed by a terminal, comprising:
    judging whether a bit count of uplink control information (UCI) meets a predetermined bit count range;
    in a case that the bit count of the UCI meets the predetermined bit count range, determining a resource for transmitting the UCI according to a reference cyclic redundancy check (CRC) bit count;
    transmitting the UCI on the determined resource for transmitting the UCI,
    wherein determining the resource for transmitting the UCI according to the reference CRC bit count comprises at least one of following cases:
        case 1: in a case that the UCI is transmitted on a physical uplink control channel (PUCCH), calculating an actual resource block (RB) count of RBs used by the PUCCH according to the reference CRC bit count;
        case 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;
        case 3: in a case that the UCI comprises a CSI part 2, determining a resource for transmitting the CSI part 2 and a resource for transmitting UCI other than the CSI part 2 among a determined PUCCH resource according to the reference CRC bit count;
        case 4: in a case that the UCI is transmitted on a physical uplink shared channel (PUSCH), calculating a size of a transmission resource, on the PUSCH, of the UCI according to the reference CRC bit count.

2. The information transmission method according to claim 1, wherein the predetermined bit count range is greater than or equal to a first bit count value and less than a second bit count value; or,
    the predetermined bit count range is greater than or equal to the first bit count value,
    wherein the first bit count value is 360, and/or the second bit count value is 1013.

3. The information transmission method according to claim 1, wherein the reference CRC bit count is determined by following steps:
    determining that the reference CRC bit count is a predetermined CRC bit count value; or,
    judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; determining that the reference CRC bit count is a predetermined CRC bit count value in a case that the first encoded bit count is less than the preset threshold value, wherein the second predetermined CRC bit count is greater than the first predetermined CRC bit count; or,
    judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining that the reference CRC bit count is a predetermined CRC bit count value in a case that the second encoded bit count is greater than or equal to the preset threshold value; or,
    judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at a predetermined code rate is greater than or equal to a preset threshold value in a case that the first encoded bit count is less than the preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or,
    judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at a predetermined code rate is greater than or equal to a preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at a predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is a predetermined CRC bit count value in a case that the first encoded bit count is less than a preset threshold value and the second encoded bit count is greater than or equal to a preset threshold value, wherein the first predetermined CRC bit count is 11 bits, and/or, the second predetermined CRC bit count is 22 bits, and/or, the preset threshold value is 1088.

4. The information transmission method according to claim 1, wherein, before determining the resource for transmitting the UCI according to the CRC bit count, the method further comprises:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

5. An information transmission method, performed by a base station, comprising:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

receiving the UCI on the determined resource for transmitting the UCI, wherein determining the resource for transmitting the UCI according to the reference CRC bit count comprises at least one of following cases:

case 1: in a case that the UCI is transmitted on a physical uplink control channel (PUCCH), calculating an actual resource block (RB) count of RBs used by the PUCCH according to the reference CRC bit count;

case 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;

case 3: in a case that the UCI comprises a CSI part 2, determining a resource for transmitting the CSI part 2 and a resource for transmitting UCI other than the CSI part 2 among a determined PUCCH resource according to the reference CRC bit count;

case 4: in a case that the UCI is transmitted on a physical uplink shared channel (PUSCH), calculating a size of a transmission resource, on the PUSCH, of the UCI according to the reference CRC bit count.

6. The information transmission method according to claim 5, wherein the predetermined bit count range is greater than or equal to a first bit count value and less than a second bit count value; or, the predetermined bit count range is greater than or equal to the first bit count value, wherein the first bit count value is 360, and/or the second bit count value is 1013.

7. The information transmission method according to claim 5, wherein the reference CRC bit count is determined by following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is a predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at a predetermined code rate is greater than or equal to the preset threshold value in a case that the first encoded bit count is less than a preset threshold value, determining that the reference CRC bit count is the first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at a predetermined code rate is greater than or equal to a preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than a preset threshold value and the second encoded bit count is greater than or equal to the preset threshold value, wherein the first predetermined CRC bit count is 11 bits, and/or, the second predetermined CRC bit count is 22 bits, and/or, the preset threshold value is 1088.

8. The information transmission method according to claim 5, wherein, before determining the resource for transmitting the UCI according to the reference CRC bit count, the method further comprises:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

9. A terminal, comprising: a transceiver, a storage, a processor and a program stored on the storage and configured to be executed by the processor, wherein the processor is configured to execute the program to implement following steps:

judging whether a bit count of uplink control information (UCI) meets a predetermined bit count range;

in a case that the bit count of the UCI meets the predetermined bit count range, determining a resource for transmitting the UCI according to a reference cyclic redundancy check (CRC) bit count;

transmitting, by means of the transceiver, the UCI on the determined resource for transmitting the UCI, wherein the processor is configured to execute the program to further implement at least one of following cases:

case 1: in a case that the UCI is transmitted on a physical uplink control channel (PUCCH), calculating an actual resource block (RB) count of RBs used by the PUCCH according to the reference CRC bit count;

case 2: in a case that the UCI is channel state information (CSI) and multiple PUCCH resources for transmitting multiple CSIs are configured, selecting one PUCCH resource for transmitting the CSI from the multiple PUCCH resources for transmitting the multiple CSIs according to the reference CRC bit count;

case 3: in a case that the UCI comprises a CSI part 2, determining a resource for transmitting the CSI part 2 and a resource for transmitting UCI other than the CSI part 2 among a determined PUCCH resource according to the reference CRC bit count;

case 4: in a case that the UCI is transmitted on a physical uplink shared channel (PUSCH), calculating a size of a transmission resource, on the PUSCH, of the UCI according to the reference CRC bit count.

10. The terminal according to claim 9, wherein the predetermined bit count range is greater than or equal to a first bit count value and less than a second bit count value; or, the predetermined bit count range is greater than or equal to the first bit count value, wherein the first bit count value is 360, and/or the second bit count value is 1013.

11. The terminal according to claim 9, wherein the processor is configured to execute the program to further implement following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is a predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at a predetermined code rate is greater than or equal to a preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at the predetermined code rate is greater than or equal to a preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at a predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is the predetermined CRC bit count value in a case that the first encoded bit count is less than the preset threshold value and the second encoded bit count is greater than or equal to the preset threshold value, wherein the first predetermined CRC bit count is 11 bits, and/or, the second predetermined CRC bit count is 22 bits, and/or, the preset threshold value is 1088.

12. The terminal according to claim 9, wherein the processor is configured to execute the program to further implement following steps:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

13. A base station, comprising: a transceiver, a storage, a processor and a program stored on the storage and configured to be executed by the processor, wherein the processor is configured to execute the steps of the information transmission method according to claim 5.

14. The base station according to claim 13, wherein the predetermined bit count range is greater than or equal to a first bit count value and less than a second bit count value; or, the predetermined bit count range is greater than or equal to the first bit count value, wherein the first bit count value is 360, and/or the second bit count value is 1013.

15. The base station according to claim 13, wherein the processor is configured to execute the program to further implement following steps:

determining that the reference CRC bit count is a predetermined CRC bit count value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value, determining that the reference CRC bit count is a predetermined CRC bit count value in a case that the first encoded bit count is less than the preset threshold value, wherein the second predetermined CRC bit count is greater than the first predetermined CRC bit count; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a first encoded bit count corresponding to a sum of the bit count of the UCI and a first predetermined CRC bit count at a predetermined code rate is greater than or equal to a preset threshold value, determining that the reference CRC bit count is a second predetermined CRC bit count in a case that the first encoded bit count is greater than or equal to the preset threshold value; judging whether a second encoded bit count corresponding to a sum of the bit count of the UCI and a second predetermined CRC bit count at the predetermined code rate is greater than or equal to a preset threshold value in a case that the first encoded bit count is less than the preset threshold value, determining that the reference CRC bit count is the first predetermined CRC bit count in a case that the second encoded bit count is less than the preset threshold value, determining that the reference CRC bit count is a predetermined CRC bit count value in a case that the second encoded bit count is greater than or equal to the preset threshold value; or, judging whether a second encoded bit count corresponding to a sum of the bit count of the UCI and a second predetermined CRC bit count at a predetermined code rate is greater than or equal to a preset threshold value, determining that the reference CRC bit count is a first predetermined CRC bit count in a case that the second encoded bit count is less than the preset threshold value; determining whether a first encoded bit count corresponding to a sum of the bit count of the UCI and a first predetermined CRC bit count at the predetermined code rate is greater than or equal to the preset threshold value in a case that the second encoded bit count is greater than or equal to the preset threshold value, determining that the reference CRC bit count is the second predetermined CRC bit count in a case that the first encoded bit count is greater than or equal to the preset threshold value, determining that the reference CRC bit count is a predetermined CRC bit count value in a case that the first encoded bit count is less than the preset threshold value; or, determining a first encoded bit count corresponding to a sum of the bit count of the UCI and a first predetermined CRC bit count at a predetermined code rate and determining a second encoded bit count corresponding to a sum of the bit count of the UCI and a second predetermined CRC bit count at the predetermined code rate, determining that the reference CRC bit count is the second predetermined CRC bit count in a case that the first encoded bit count is greater than or equal to a preset threshold value, determining that the reference CRC bit count is the first predetermined CRC bit count in a case that the second encoded bit count is less than the preset threshold value, determining that the reference CRC bit count is a predetermined CRC bit count value in a case that the first encoded bit count is less than the preset threshold value and the second encoded bit count is greater than or equal to the preset threshold value, wherein the first predetermined CRC bit count is 11 bits, and/or, the second predetermined CRC bit count is 22 bits, and/or, the preset threshold value is 1088.

16. The base station according to claim 13, wherein the processor is configured to execute the program to further implement following steps:

judging whether a maximum encoded bit count of UCI carried on an uplink channel for carrying UCI is greater than or equal to a preset threshold value;

in a case that the maximum encoded bit count is greater than or equal to the preset threshold value, performing the step of determining the resource for transmitting the UCI according to the reference CRC bit count.

\* \* \* \* \*